United States Patent [19]
De Vries, Jr. et al.

[11] Patent Number: 5,857,358
[45] Date of Patent: Jan. 12, 1999

[54] METHOD AND APPARATUS FOR BENDING GLASS

[75] Inventors: Martin De Vries, Jr.; Donald L. Bareman; Mervin Dirkse, all of Holland; Niels Alfred Olesen, Zeeland; James M. Beebe, Grand Haven, all of Mich.

[73] Assignee: Donnelly Corporation, Holland, Mich.

[21] Appl. No.: 735,885

[22] Filed: Oct. 23, 1996

[51] Int. Cl.⁶ .............................. C03B 23/03; B28B 7/32; B21D 31/00
[52] U.S. Cl. .................................. 65/106; 65/160; 65/268; 65/273; 65/287; 65/291; 65/356; 264/314; 425/389; 425/405.1; 72/379.2
[58] Field of Search ................................. 65/106, 111, 64, 65/25.4, 268, 273, 275, 287, 291, 355, 356, 160, DIG. 13, 374.12; 264/1.33, 2.7, 314; 425/405.1, 389, 403; 72/379.2

[56] References Cited

U.S. PATENT DOCUMENTS

| | | | |
|---|---|---|---|
| 2,353,996 | 7/1944 | Cooke et al. | 264/314 |
| 2,570,309 | 10/1951 | Black | 49/7 |
| 2,575,734 | 11/1951 | Schulman | 425/405.1 |
| 2,817,928 | 12/1957 | Lambert et al. | 49/84 |
| 3,128,322 | 4/1964 | Young | 264/314 |
| 3,265,484 | 8/1966 | Ritter, Jr. | 65/104 |
| 3,333,934 | 8/1967 | Seymour | 65/32 |

(List continued on next page.)

FOREIGN PATENT DOCUMENTS

| | | |
|---|---|---|
| 0373265 | 6/1990 | European Pat. Off. . |
| 0404676 | 12/1990 | European Pat. Off. . |
| 0404677 | 12/1990 | European Pat. Off. . |
| 0667320 | 8/1995 | European Pat. Off. . |
| 1540411 | 9/1968 | France . |
| 1553891 | 1/1969 | France . |
| 1559723 | 3/1969 | France . |
| 1010245 | 6/1957 | Germany . |
| 51-513 | 1/1976 | Japan . |
| 51-49271 | 4/1976 | Japan ..................................... 264/314 |

OTHER PUBLICATIONS

Leo Alting, *Manufacturing Engineering Processes*, "Solid Materials: Mass–Conserving Processes", pp. 148, 149, and 162.

*Primary Examiner*—Steven P. Griffin
*Attorney, Agent, or Firm*—Van Dyke, Gardner, Linn & Burkhart, LLP

[57] ABSTRACT

A method of and apparatus for bending a sheet of material heated to a formable, state such as glass, resinous polymeric material, viscoelastic material, and thermoplastic material, provides an improved pressing member for pressing the heated sheet against a first rigid mold which reduces the size of the buckles in the bent sheet, eliminates the need for a second rigid mold, reduces the process control steps, reduces the risk of damaging the rigid mold, increases the tolerances for the positioning of the sheet in the apparatus, and increases the range of application. The pressing member includes a flexible diaphragm which rolls the heated sheet against a rigid mold by first applying a pressure to a portion of the heated sheet and then radiating the pressure from that portion to the remaining surface area of the heated sheet in a rolling action. The bending apparatus includes a rigid mold and a flexible diaphragm pressurized into a convex shape for initially pressing on a portion of the heated sheet. A control system moves the pressing member toward the rigid mold and maintains the pressure on the flexible diaphragm so that as the pressing member is moved toward the rigid mold, the flexible member generally conforms to the shape of the rigid mold and rolls the heated sheet onto the rigid mold. To further reduce the size of any buckles, a holder for supporting the heated sheet between the rigid mold and the flexible diaphragm is provided. The holder includes a support surface for supporting the heated sheet generally planar before bending.

95 Claims, 6 Drawing Sheets

5,857,358
Page 2

U.S. PATENT DOCUMENTS

| | | | |
|---|---|---|---|
| 3,374,077 | 3/1968 | Cypher | 65/104 |
| 3,459,521 | 8/1969 | Nedelec | 65/25 |
| 3,473,909 | 10/1969 | Bennett et al. | 65/106 |
| 3,507,639 | 4/1970 | Seymour | 65/104 |
| 3,600,150 | 8/1971 | Rougeux | 65/268 |
| 3,607,188 | 9/1971 | Stilley | 65/106 |
| 3,634,059 | 1/1972 | Miller | 65/287 |
| 3,677,731 | 7/1972 | Martin | 65/106 |
| 3,806,330 | 4/1974 | Martin | . |
| 3,816,089 | 6/1974 | Seymour | 65/287 |
| 3,837,833 | 9/1974 | Couture et al. | 65/288 |
| 4,043,782 | 8/1977 | Bamford et al. | 65/104 |
| 4,043,784 | 8/1977 | Reese et al. | 65/107 |
| 4,184,865 | 1/1980 | Liebal | 65/356 |
| 4,204,853 | 5/1980 | Seymour | 65/106 |
| 4,233,050 | 11/1980 | Comperatore et al. | 65/107 |
| 4,312,823 | 1/1982 | Kraakman et al. | 425/405.1 |
| 4,361,433 | 11/1982 | Smith, Jr. et al. | 65/106 |
| 4,364,766 | 12/1982 | Nitschke | 65/DIG. 13 |
| 4,522,641 | 6/1985 | Hagedorn et al. | 65/287 |
| 4,555,258 | 11/1985 | Curiel | 65/355 |
| 4,678,495 | 7/1987 | Yoshizawa | 65/106 |
| 4,723,976 | 2/1988 | Shanaberger | 65/160 |
| 4,825,376 | 4/1989 | Brinker et al. | 65/DIG. 13 |
| 4,902,331 | 2/1990 | Vanaschen et al. | 65/106 |
| 4,906,271 | 3/1990 | D'Iribarne et al. | 65/273 |
| 4,918,946 | 4/1990 | Vanaschen et al. | 65/273 |
| 4,950,320 | 8/1990 | Vanaschen et al. | 65/273 |
| 4,983,205 | 1/1991 | Kuster et al. | 65/290 |
| 5,007,949 | 4/1991 | Mathivat et al. | 65/160 |
| 5,021,075 | 6/1991 | Vanaschen et al. | 65/287 |
| 5,053,069 | 10/1991 | Vanaschen et al. | 65/106 |
| 5,079,931 | 1/1992 | Lehto et al. | 65/106 |
| 5,122,176 | 6/1992 | Goettler | 65/102 |
| 5,139,552 | 8/1992 | Yoshizawa et al. | 65/273 |
| 5,178,660 | 1/1993 | Wampler et al. | 65/356 |
| 5,203,905 | 4/1993 | Kuster et al. | 65/287 |
| 5,261,808 | 11/1993 | Onoe et al. | 425/405.1 |
| 5,320,661 | 6/1994 | Fecik et al. | 65/106 |
| 5,387,270 | 2/1995 | Bremer et al. | 65/29.12 |
| 5,427,599 | 6/1995 | Greschner et al. | 65/374.12 |
| 5,649,990 | 7/1997 | Frank et al. | 65/291 |
| 5,656,055 | 8/1997 | Frank et al. | 65/287 |

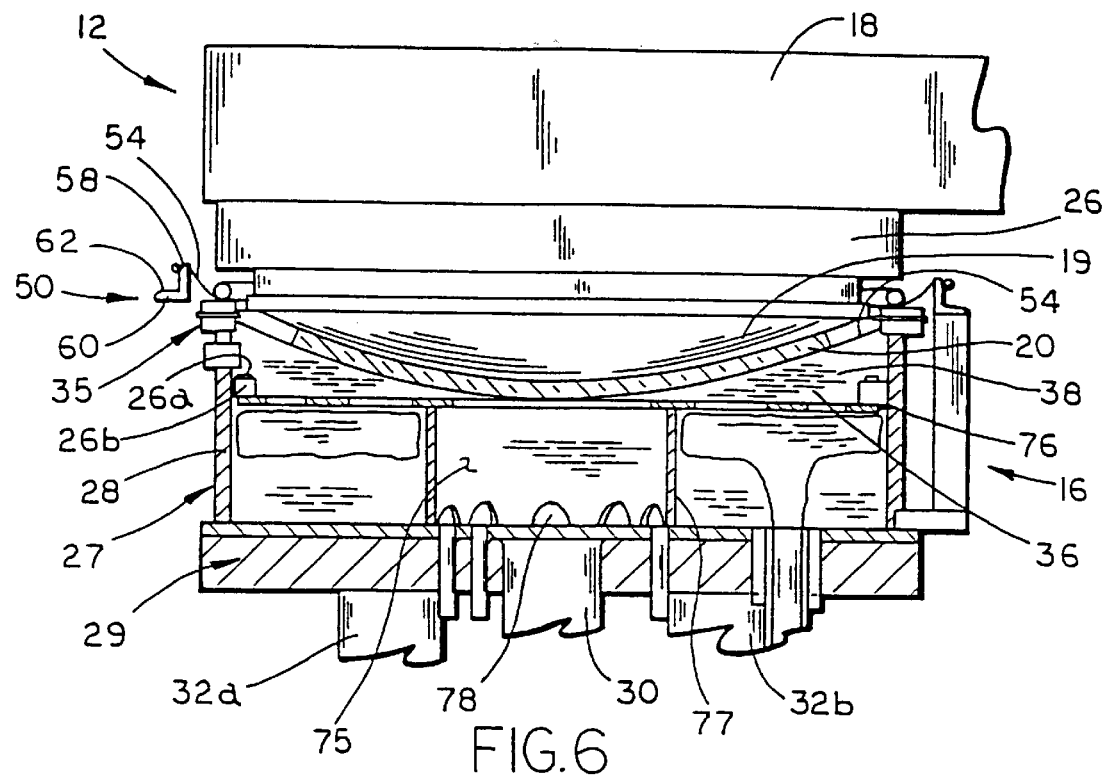
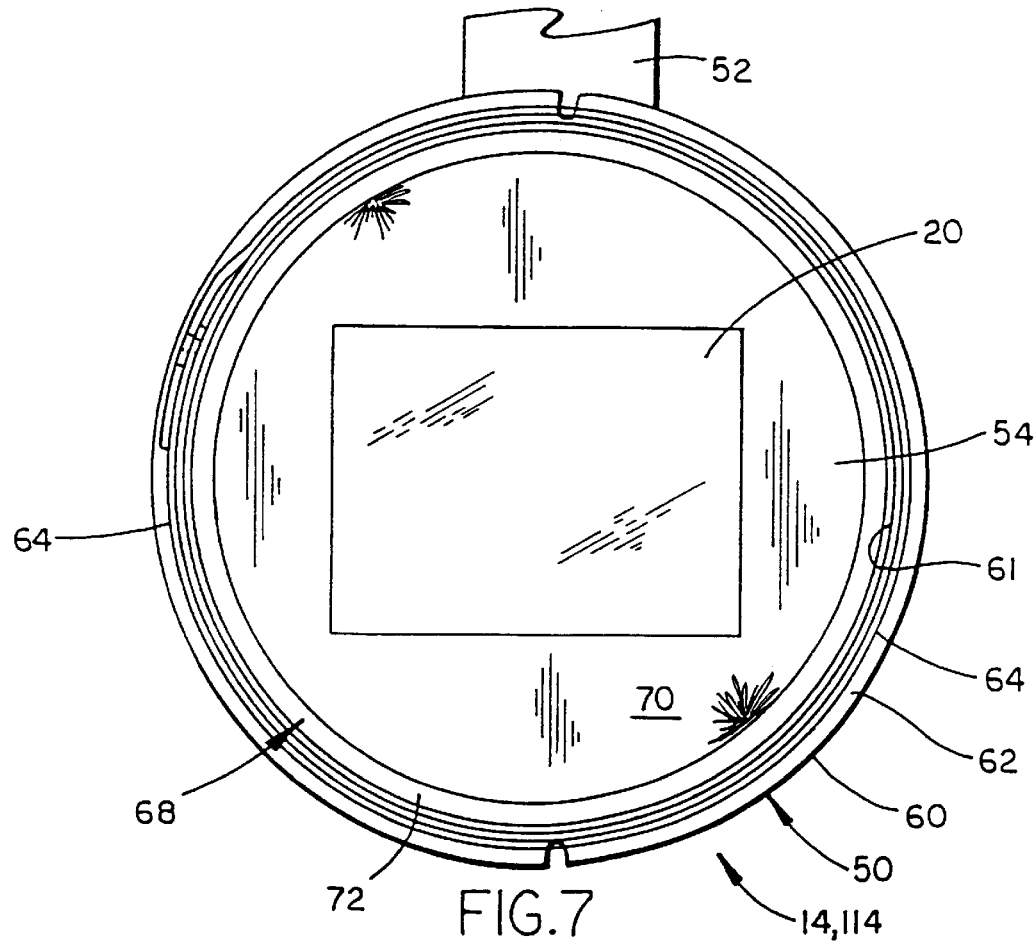

METHOD AND APPARATUS FOR BENDING GLASS

TECHNICAL FIELD AND BACKGROUND OF THE INVENTION

The present invention relates to an improved method of and apparatus for bending glass or other sheet material heated to a formable state. More particularly, the present invention relates to a method and apparatus for bladder-molding glass.

A conventional glass bending apparatus typically includes two rigid molds—a male mold and female mold—which are brought together to conform a heated sheet of glass positioned therebetween to the shape of the two molds during the press cycle of the bending process. Some bending methods may include a slump bending step, which is initiated before the press cycle begins. In such a step, the heated glass sheet may be held in a holder that includes a generally concave, upper support surface, formed by a formable material such as a stainless steel mesh sheet. Since the sheet of glass is heated to a temperature in the range of 1000 degrees Fahrenheit to 1250 degrees Fahrenheit and is, therefore, in a partially molten state, the glass sheet partially conforms to the concave shape of the mesh sheet. Thereafter, as the female mold is moved towards the male mold, the female mold presses against the edge portions of the heated sheet of glass and the male mold presses on the center of the heated sheet of glass to start the press cycle of the bending process. As the two molds are pressed together, the bearing contact and pressure exerted by the molds on the edge portions and in the center causes the molds to further bend the sheet of glass. As the sheet bends, the bearing contact and pressure from the female mold expands from the edge portions of the sheet inward until it meets with the bearing pressure from the male mold, somewhere between the center and the perimeter of the sheet. Consequently, as the bearing pressure expands inwardly from the perimeter of the glass sheet, buckles form at the periphery of the plate to relieve forces due to the foreshortening of the compression side of the glass. As the bending is increased the buckles extend toward the center. The magnitude of the buckles are the greatest at the edge of the glass sheet, diminishing toward the center of the sheet.

The larger the buckles and the further the buckles extend into the glass sheet, the smaller the useable area of the glass. This useable area is referred to as the "quality area." The size of the quality area directly impacts the value of the glass. The larger the quality area, the larger the size of the final product—the curved glass—and the greater the profit. In optical quality glass or plastic, the tolerance for distortions in the surface of the glass is extremely low. Hence the size of the quality area for optical glass is relatively small when conventional glass bending techniques are used.

In addition to the limitations on the quality of the glass produced by conventional glass bending techniques, there are numerous process controls. The male and female molds require accurate alignment. This step can take up to two hours. Furthermore, the two rigid molds of the conventional glass bending apparatus require substantially perfect alignment of the heated sheet of glass between the two molds. If the glass sheet is not properly aligned, the peripheral edges of the sheet rest in a non-horizontal plane within the female mold so that when the female mold is moved toward the male mold, the male mold will first make contact with a portion of the glass that is off-set from the center of the glass sheet. Therefore, the glass sheet will have a bend that is off-center and, more than likely, the glass sheet will exhibit exaggerated buckling at least on one side of the plate. Moreover, the conventional glass bending apparatus requires the temperature of the heated sheet of glass to be controlled within about 5 degrees. Also, debris, such as broken pieces of glass, that may be inadvertently left in the molding apparatus could damage one or both of the molds during the bending process.

It will be understood from the foregoing that the conventional bending apparatus requires numerous control steps and inputs, because it is very sensitive to changes in the sheet size, the material properties of the sheet, the state of the sheet, i.e., its temperature and condition, alignment of the molds, and placement of the sheet within the assembly. At the same time, due to the variations in the glass sheet, the pressures exerted by the female and male molds are typically non-uniform and, consequently, result in less control in the bending process.

Consequently, there is a need for an improved glass bending apparatus and method that will reduce the size of the buckles of the glass sheet during bending, increase the size of the quality zone, provide a greater range of tolerance for the alignment of a heated sheet of glass within the molding apparatus, reduce the number of process steps and inputs required to control the process, and reduce the risk of damage to the molds, while at the same time providing more control and uniformity to the bending process.

SUMMARY OF THE PRESENT INVENTION

Accordingly, the present invention provides a new and unique method and apparatus for bending glass for use in convex mirrors, aspherical mirrors, computer face plates, and optical plates for displays, or the like, which includes a pressing member that rolls a sheet of material heated to a formable state against a rigid mold. The pressing member applies a pressure to a portion of the heated sheet first and radiates the pressure from that portion to the rest of the surface area of the glass sheet in a rolling action, thereby providing uniform pressure to the heated sheet.

According to one aspect of the invention, a bladder-bending machine is disclosed which includes a rigid mold and a conformable pressing element. The pressing element is adapted to assume a convex upper surface for pressing a portion of the heated sheet against the rigid mold and for rolling the heated sheet from that portion against the molding surface of the rigid mold by radiating the pressure from that portion to the remaining surface area of the heated sheet.

In one preferred aspect, the rigid mold comprises a rigid male mold, and the conformable pressing element first contacts a central portion of the heated sheet and thereafter rolls the heated sheet toward its peripheral edges whereby the heated sheet conforms to the rigid convex shape of the male mold. In another aspect, the rigid mold comprises a rigid female mold.

In other aspects of the invention, the pressing element comprises a pressurized conformable membrane. The membrane is preferably supported by a frame above a chamber. The chamber includes a fluid that is pressurized by a body of compressible fluid, such as air, to press the membrane against the heated sheet. As the membrane continues to press the heated sheet against the rigid mold, the membrane conforms the heated sheet to the shape of the rigid mold by effectively rolling the heated sheet onto the rigid mold. In further aspects of this invention, the fluid in the chamber is pressurized by a confined, compressible fluid or gas such as an air bag.

In yet other aspects, the conformable membrane is supported in an open ended frame. The frame includes a chamber positioned below the membrane which holds a selectively pressurized fluid to inflate the membrane so that it assumes the convex upper surface for pressing the heated sheet against the rigid mold. Preferably, the frame includes a control device to control the pressure of the fluid to a programmed pressure so that as the membrane presses the heated sheet against the rigid mold, the pressure in the fluid is released by the control device, allowing the membrane to roll against the heated sheet. Furthermore, the rigid mold may include at least one thermal discontinuity. The thermal discontinuity may comprise an opening or an insert having a different coefficient of thermal conductivity than the rigid mold. Also, the thermal discontinuity may be aligned along an axis of bending. The thermal discontinuity causes stress marks to form in the bent sheet, which are useful for later alignment of the bent sheet, for example when the bent sheet is cut to size.

In other aspects of the invention, an apparatus for bending a sheet of material heated to a formable state includes a rigid mold, a flexible membrane, and a holder. The holder is adapted for holding the heated sheet generally flat. In one aspect, the holder comprises a hoop frame and a support surface comprising a flexible fabric supported by the hoop frame. The flexible fabric may comprise a stretched stainless steel wire cloth or thin perforated metal sheet, which is formed close to the desired final bend shape. The fabric may also comprise metal cloth with a layer of high temperature cloth thereon which engages the heated sheet.

In other aspects of the invention, the bending apparatus includes a holder assembly which includes a flexible, high temperature cloth, which resists the high temperatures to which the sheet is heated for supporting the heated sheet. The flexible, high temperature cloth is adapted to hold the heated sheet substantially flat before bending and permits the pressurized, conformable membrane to press the heated sheet and the high temperature cloth against the rigid mold to conform the heated sheet to the shape of the rigid mold. In one aspect, the flexible high temperature cloth includes a weight to tension the cloth so that the heated sheet is held generally flat on the cloth.

According to another aspect, the bending apparatus includes a press frame, a rigid mold supported by the press frame, a bladder frame having an open end, a flexible membrane supported by the bladder frame over the open end, and a control system to increase or decrease the pressure on the flexible membrane and to move one of the rigid mold and the bladder frame toward the other for rolling a sheet of material heated to a formable state on the rigid mold. In one aspect of this invention, the rigid mold includes at least one aperture for directing air between the heated sheet and the rigid mold after a completed press cycle to release the bent sheet from the rigid mold when the press cycle is completed.

In yet another aspect of the invention, a holder for holding a sheet of material heated to a formable state between two molds includes a hoop frame and a flexible, high temperature cloth supported by the hoop frame. The high temperature cloth forms a flexible support surface for supporting the heated sheet.

Several advantages of the present invention are apparent from the preceding summary. By providing a conformable pressing member, the second rigid mold assembly of a conventional bending apparatus is eliminated, thus eliminating the attendant problems with and limitations of a two mold bending apparatus and method. Furthermore, the conforming pressing apparatus may be used to bend products of varying thickness and dimensions. In the conventional two mold assembly, the molds must be customized for sheets of different thickness and dimensions. Because of the flexible, conformable characteristics of the conformable pressing element, the rigid mold is not subject to damage if a foreign object is inadvertently left in the bending apparatus. Moreover, the placement of the heated sheet between the rigid mold and the conformable pressing element is provided with a far greater tolerance than the two mold bending apparatus. In the conventional two mold apparatus and method, the heated sheet of rigid material must be precisely positioned between the two molds. Otherwise, the sheet may break or have a far smaller quality area due to increased offset buckling. Therefore, the present invention also eliminates process control steps and their corresponding monitors or sensors, which would otherwise be needed to provide feedback or input. Also, need for precise mold alignment is eliminated and applied pressure is totally controllable during bending, is uniform in a radial sense, and spatially uniform after bending.

These and other objects, advantages, purposes and features of the invention will become more apparent from a study of the following description taken in conjunction with the drawings.

BRIEF DESCRIPTION OF THE DRAWINGS

FIG. 6 is a cross-sectional elevational view of the glass bending apparatus similar to FIG. 4, illustrating the assembly with the flexible conformable membrane conforming to the shape of the rigid mold at the end of the pressing cycle;

FIG. 7 is a top plan view of a holder for holding a sheet of heated glass between the rigid mold and conformable membrane;

DETAILED DESCRIPTION OF THE PREFERRED EMBODIMENTS

Figure 1:
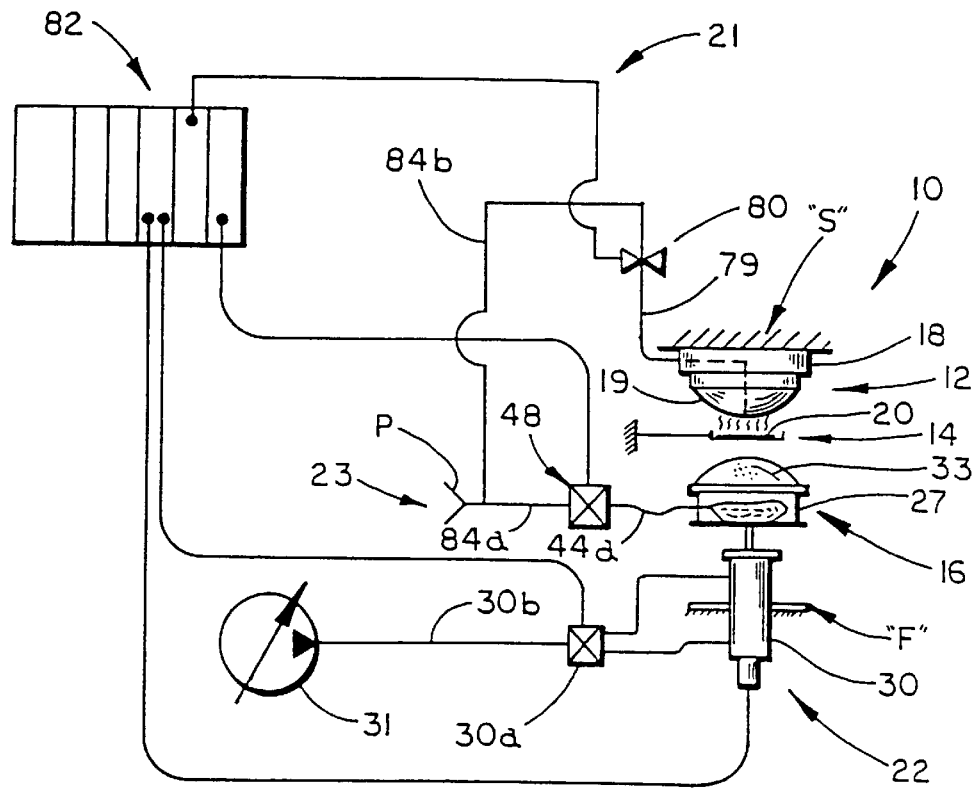
FIG. 1 is a schematic view of a first embodiment of the glass bending apparatus and the control system of the present invention.
Figure 2:
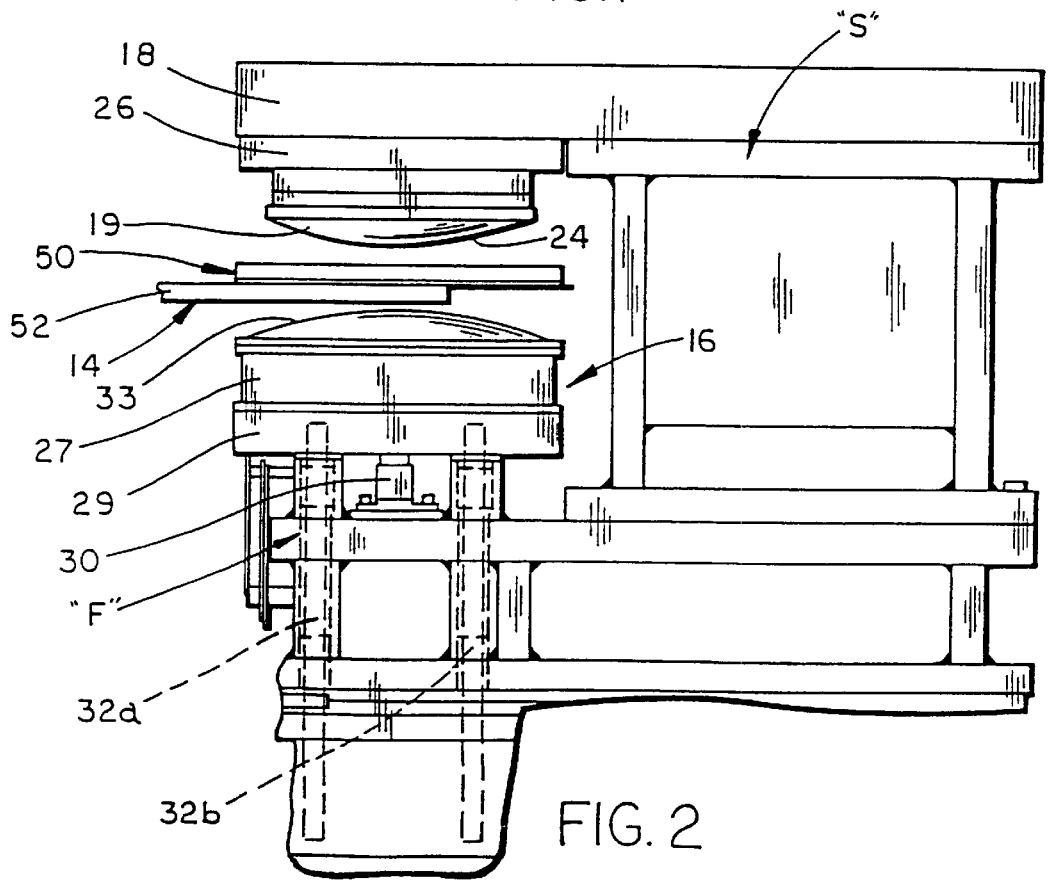
FIG. 2 is a side elevational view of the embodiment of the glass bending apparatus shown in FIG. 1 illustrating the carrier assembly positioned between the rigid mold assembly and a conformable membrane assembly in a holding position.
Figure 3:
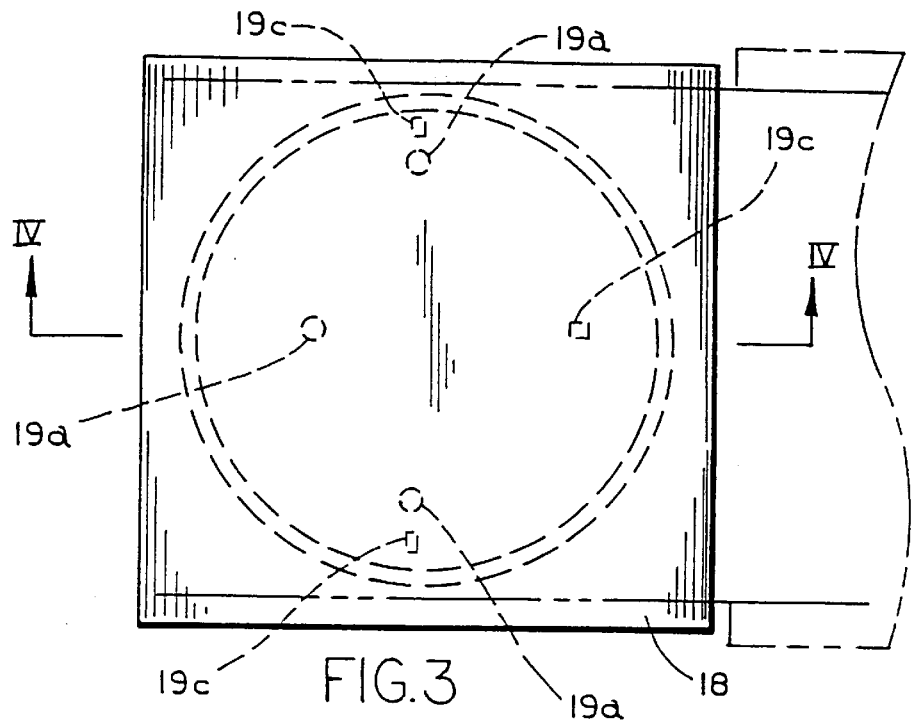
FIG. 3 is a top plan view of the molding apparatus.

Referring to FIG. 1, a bladder-molding apparatus 10 in accordance with the present invention is shown in a holding position. The bladder-molding apparatus 10 includes a rigid mold assembly 12, a carrier or holder assembly 14, and a conformable pressing assembly 16. The rigid mold assembly 12 includes a press frame 18, which is supported on a rigid support structure S, and a rigid mold 19 supported from the press frame 18 on to which a sheet 20 heated to a formable state such as glass, plastic/resinous polymeric material, viscoelastic material, thermoplastic material, or other formable material, is pressed and rolled by conformable pressing assembly 16. The operation of the bladder-molding apparatus is controlled by a control system 21 through a drive system 22 and a pressure system 23, as will be more fully described.

As is best seen in FIGS. 2–6, in one preferred embodiment the rigid mold 19 preferably comprises a generally solid male mold formed from a material with a high coefficient of thermal conductivity. Alternatively, the rigid mold may comprise a rigid female mold, as will more fully described below in reference to FIG. 10, or a mold with a surface having a complex curvature. Preferably, rigid mold 19 comprises a generally solid aluminum or aluminum alloy mold having a smooth, convex outer surface 24 on which the heated rigid sheet 20 is rolled, as will be explained in more detail below. The term convex as used in this specification includes curved or radiused, spherical and multi-radiused curved surfaces. Rigid mold's 19 molding surface is preferably covered by a high temperature fabric/cloth 54 as will be explained below. Cloth/fabric 54 is held in place by a band clamp 17, such as a large hose clamp, which extends over the perimeter of fabric/cloth 54 and around a groove 17a of mold 19 to thereby secure fabric/cloth 54 to mold 19. Rigid mold 19 is supported by press frame 18 on a cooling plate 26. Cooling plate 26 operates as a heat sink for rigid mold 19. Cooling plate 26 preferably comprises an aluminum or metal plate with transverse passages to accommodate the flow of cooling fluid, which cools cooling plate 26 and rigid mold 19 primarily by thermal conduction. The final shape of the bent material is determined by the rate of cooling from the top surface to the bottom surface of the material during pressing and cooling below the strain point of the material. By varying the temperature of the top mold, the shape of the part can be varied. This process becomes stable when the system has reached equilibrium temperature. If the mold is too cold, condensation will occur. Condensation can cause glass breakage. Consequently, the temperature of the mold and the cooling plate should be above the dew point of the surrounding air. Preferably, cooling plate 26 cools rigid mold 19 to maintain the temperature of the rigid mold between about 40 degrees F. and 120 degrees F. More preferably, cooling plate 26 cools rigid mold 19 to maintain the temperature of the rigid mold between about 80 degrees F. and 120 degrees F. Most preferably, cooling plate 26 cools rigid mold 19 to about 100 degrees F.

Conformable pressing assembly 16 is adapted to extend and press a heated sheet of formable material, such as glass, plastic/resinous polymeric material, viscoelastic material, thermoplastic material, or other formable material, against the rigid mold 19. As best shown in FIGS. 2—6, conformable pressing assembly 16 comprises an open ended bladder frame 27 which is extendably supported on a rigid frame F. Opened ended bladder frame 27 is formed from a cylindrical wall 28 that is welded or otherwise secured to the die plate 29. In order to extend conformable pressing assembly 16, die plate 29 is extendably supported on a frame F by a power cylinder 30, which is extended and withdrawn to move conforming pressing assembly 16 from a holding position to a pressing position. Cylinder 30 is preferably a hydraulic cylinder with an integral position sensor, available from PARKER HANNIFIN in DesPlaines, Ill. Cylinder 30 is connected by a valve 30a and a conduit 30b to a hydraulic supply 31 (FIG. 1). Alternately, cylinder 30 may comprise a pneumatic cylinder, a ball screw driven cylinder including, for example, a servo motor, or the like. Die plate 29 is stabilized on the frame F by a pair of extendable guides 32a and 32b (FIGS. 2 and 4–6), which extend through frame F as the conformable pressing assembly 16 is raised or lowered by cylinder 30.

Figure 4:
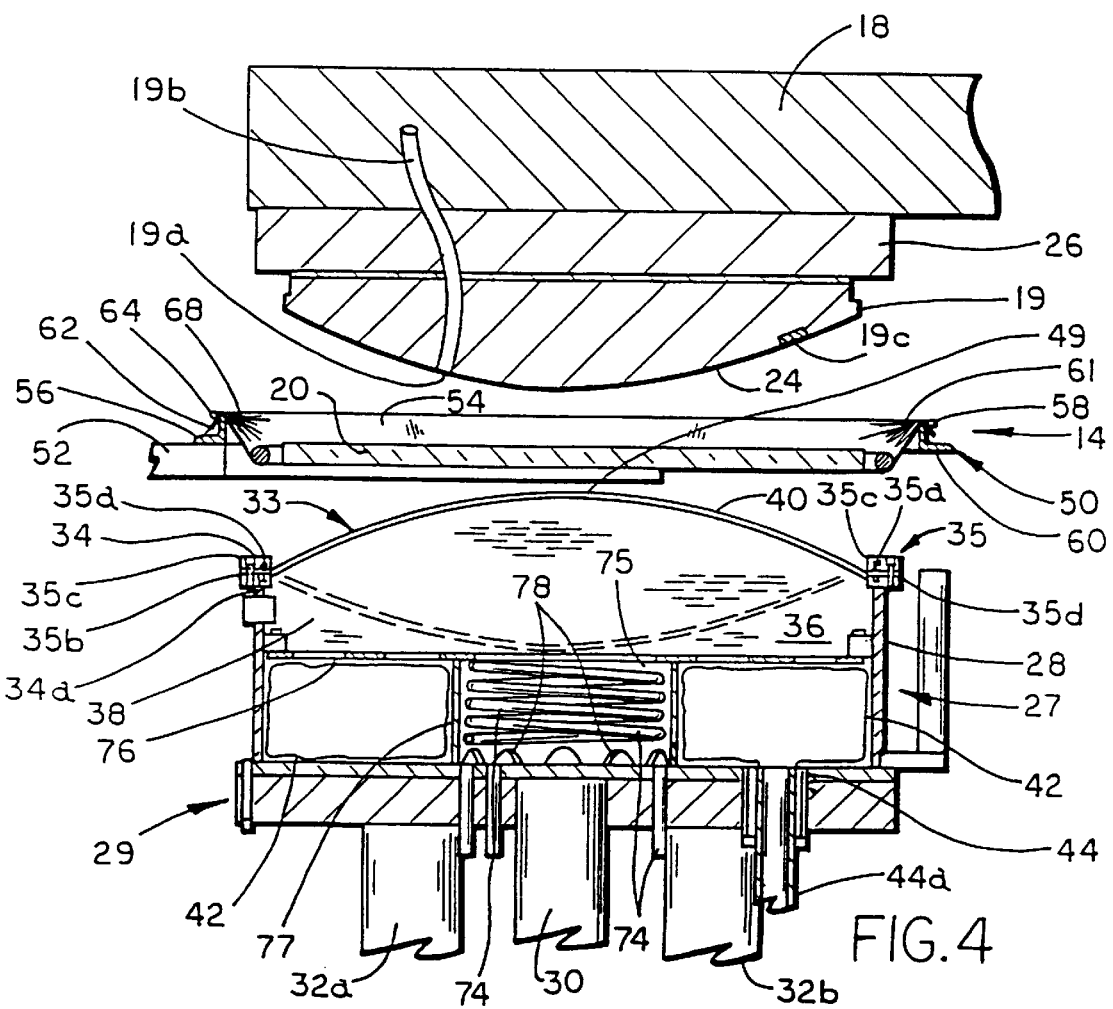
FIG. 4 is a cross-sectional, front elevational view of the glass bending apparatus, taken across line IV—IV of FIG. 3, illustrating the conformable membrane assembly with a flexible conforming membrane extended ready for pressing.

As best seen in FIG. 4, a flexible, conformable membrane 33 extends over and is secured to the perimeter 34a of an open end 34 of the frame 27 by an annular gripping element or clamp 35 that is preferably welded to the entire perimeter of cylindrical wall 28. Membrane 33 may comprise a silicone rubber material and operates like a diaphragm, flexing in (dotted lines in FIG. 4) and out (solid lines in FIG. 4) of the open end of frame 27 in response to the pressure applied from fluid 38 in the chamber 36, as explained below. Also, membrane 33 is preferably covered by a high temperature fabric or cloth 54 which may be secured to the frame along with membrane 33, as will be described below. In its extended position, membrane 33 assumes a convex upper surface 40 for rolling the sheet 20 onto the rigid mold 19 as will be more fully explained. Preferably, membrane 33 is a polymeric/fiberglass laminate with a thermal conductivity within the range of between about 2960 and 0.03 BTU in./hr. ft$^2$ °F., can withstand a temperature greater than 500° F., and has a durometer hardness reading within the range of between about 45 and 80 Shore A. More preferably, membrane 33 is a polymeric/fiberglass laminate with a thermal conductivity within the range of between about 3 and 1 BTU in./hr. ft$^2$ °F. and a durometer hardness reading within the range of between about 67 to 79 Shore A. Most preferably, membrane 33 is a polymeric/fiberglass laminate with a thermal conductivity of at least 1.9 BTU in./hr. ft$^2$ °F. and a durometer reading of at least 20 Shore A. Moreover, the range of the thickness of membrane 33 is preferably about 0.025 mm to 10 mm thick. More preferably, membrane 33 is about 1.5 mm to 3.5 mm thick. Most preferably, membrane 33 is about 1.59 mm thick.

Figure 4A:
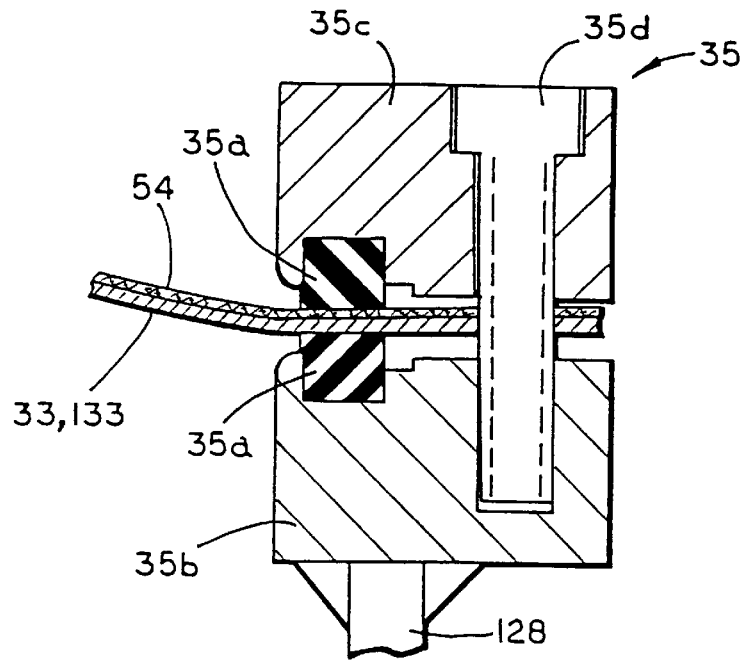
FIG. 4A is an enlarged detailed view of a gripping member holding the flexible conforming membrane.
Figure 5:
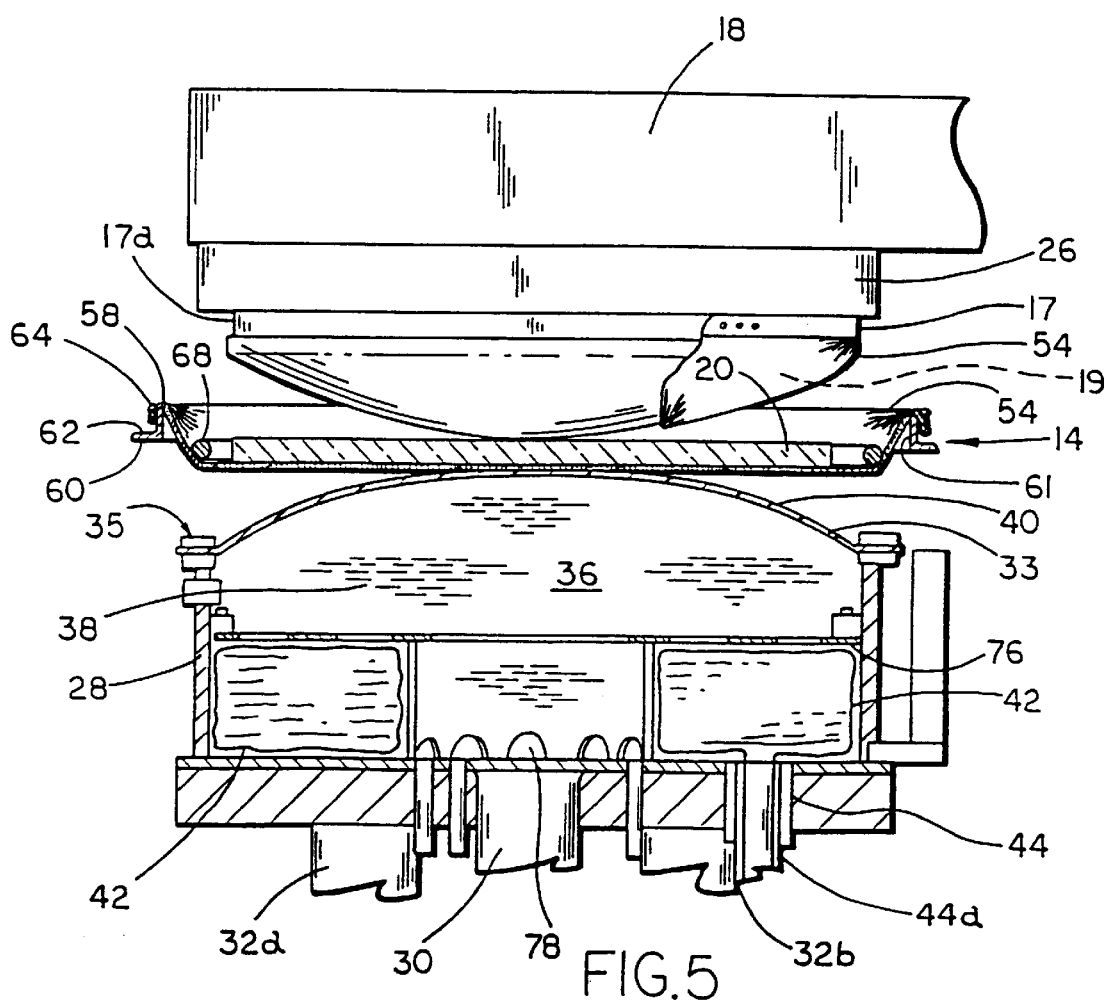
FIG. 5 is a cross-sectional, front elevational view of the glass bending apparatus similar to FIG. 4, illustrating the assembly with the flexible, conformable membrane pressing the center of the heated sheet of glass under the rigid mold.

Cylindrical wall 28, die plate 29, and membrane 33 define a chamber 36. Chamber 36 is made air tight by welding cylindrical wall 28 to die plate 29 and by a pair of continuous, o-rings 35a in gripping member 35 which provide a seal between membrane 33 and gripping member 35 (FIG. 4 and 4A). Gripping member 35 includes a lower ring 35b welded to the top edge of wall 28 and a groove in its upper surface in which one o-ring 35a is seated. An upper ring 35c has a groove in its lower surface in which the other o-ring 35a is seated. Upper and lower rings 35b, 35c are clamped together and held by a series of spaced screws 35d with the periphery of membrane 33 held therebetween.

Chamber 36 preferably holds a substantially incompressible fluid 38, such as water, that is pressurized to inflate or press on the membrane 33. Fluid 38 is pressurized by an annular, donut shaped inflatable bag/ bladder 42, such as an air bag, that is positioned in chamber 36. Bag 42 is flexible and may be formed from urethane covered nylon and is inflated or deflated with a compressible fluid, such as gaseous air, to increase or decrease the pressure of fluid 38 in the chamber 36 through tubing 44a which communicates with bag 42 through a port 44 in the frame 27. As best seen in FIG. 1, tubing 44a connects the bag 42 to a plant air supply P through the control system 21. The air entering port 44 is preferably regulated by control system 21 through a valve 48. Valve 48 is preferably a proportional valve which operates as a pressure regulator to release the pressure in the air bag 42 when the pressure in the fluid 38 exceeds a desired maximum level and permits air to enter into the air bag 42 when the pressure in the fluid 38 falls below the desired pressure. Valve 48 is most preferably a pneumatic proportioning valve, series DFT also available from PARKER HANNIFIN.

The combination of the conformable membrane 33 and the generally constant pressure in the fluid 38 allows the membrane 33 to roll from the central portion of the sheet 20 to the sheet's perimeter to generally conform to the molding surface of the rigid mold 19. This rolling action significantly reduces the buckling that is associated with conventional glass bending methods and, consequently, increases the size of the quality zone. By rolling from the central portion of the heated sheet 20, the excess material, which is inherent in the bending of a heated, softened sheet of material, moves from the sheet's center to the sheet's perimeter. The length and extent of the buckles are significantly reduced. Also, any buckles which are formed are positioned toward the perimeter. While this method still induces some buckling in the sheet of rectangular glass, the buckles are smaller in depth and length and the size of the quality area is increased significantly. For example, on a sheet with dimensions of 10.5 by 8.5 inches, and the size of the quality area is increased by about ½ inch on each edge.

Figure 10:
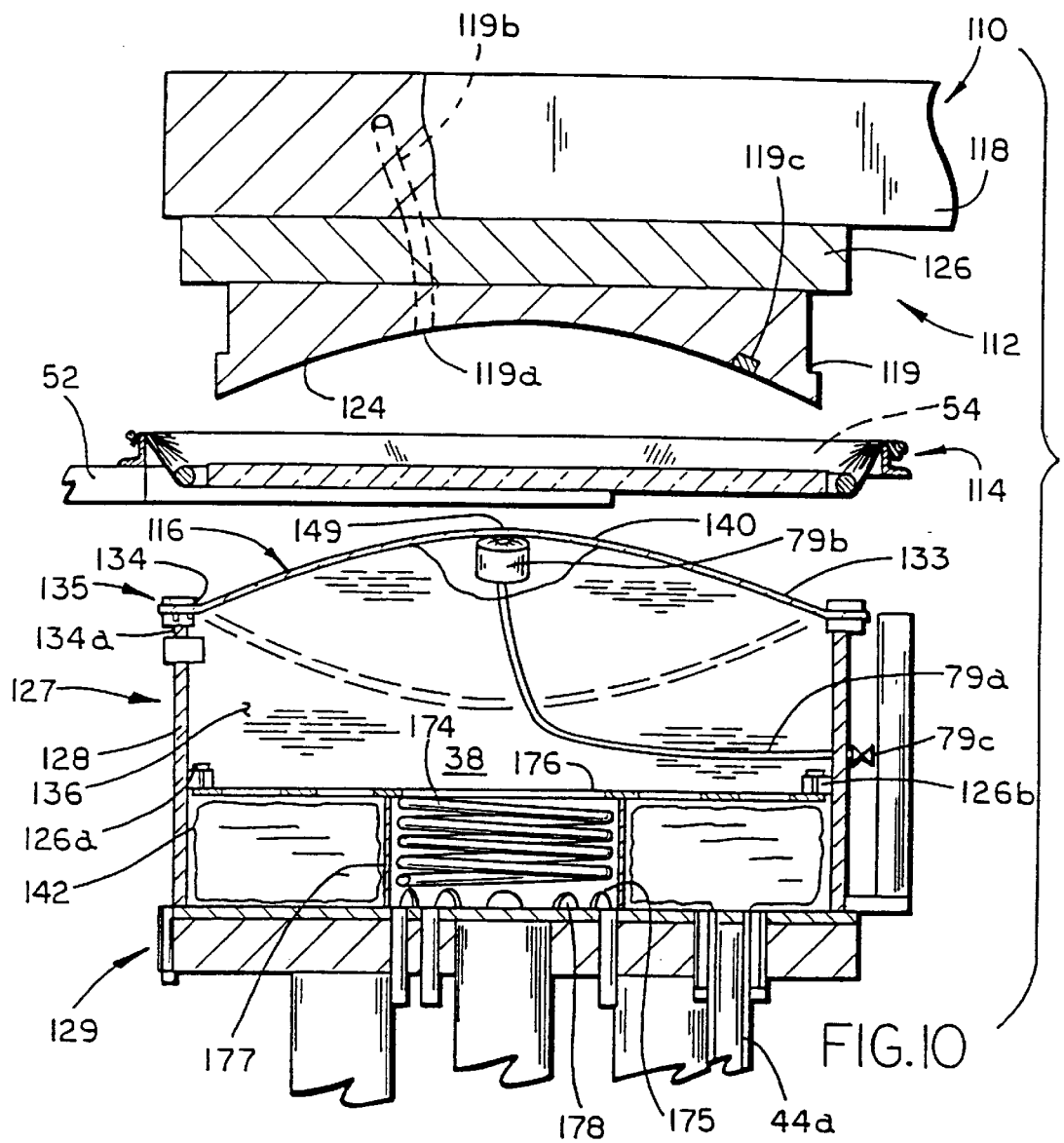
FIG. 10 is a cross-sectional view similar to FIG. 4 illustrating a second embodiment of the glass bending apparatus in which the glass sheet is pressed and rolled against a rigid female mold.

In another preferred embodiment, a bladder-molding apparatus 110 is shown in FIG. 10 and includes a rigid mold assembly 112, a carrier or holder assembly 114, and a conformable pressing assembly 116. The rigid mold assembly 112 includes a press frame 118, which is supported on a rigid support structure S, and a rigid mold 119 supported from the press frame 118 on to which heated sheet 20 is pressed and rolled by conformable pressing assembly 116. The operation of and hardware for operating bladder-molding apparatus 110 is similar to the operation of bladder-molding apparatus 10; therefore, reference is made to bladder-molding apparatus 10 for the details of the control system and hardware. As best seen in FIG. 10, the rigid mold 119 preferably comprises a generally solid female mold formed from a material with a high coefficient of thermal conductivity, similar to mold 19. Preferably, rigid mold 119 comprises a generally solid aluminum mold having a smooth, concave outer surface 124 on which the heated rigid sheet 20 is rolled, as will be explained in more detail below. Rigid mold 119 is supported by press frame 118 on a cooling plate 126. Cooling plate 126 preferably comprises an aluminum or metal plate with transverse passages to accommodate the flow of cooling fluid, which cools the rigid mold 119 primarily by thermal conduction. Reference is made to the details of cooling plate 26 as cooling plate 126 operates in a like manner to cooling plate 26.

Conformable pressing assembly 116 is adapted to extend and press a sheet of material heated to a formable state, such as glass plastic/resinous polymeric material, viscoelastic material, thermoplastic material, or other heated formable material, or the like, against the rigid mold 119. As best shown in FIG. 10, conformable pressing assembly 116 is of similar construction to conformable pressing assembly 16; therefore, reference is made to conformable pressing assembly 16 for the overall details and manner of operation of conformable pressing assembly 116. A flexible, conformable membrane 133 extends over and is secured to the perimeter 134a of an open end 134 of the frame 127 by an annular gripping element or clamp 135 that is preferably welded to the entire perimeter of cylindrical wall 128. Membrane 133 may comprise a silicone rubber material and operates like a diaphragm, flexing in (dotted lines in FIG. 10) and out (solid lines in FIG. 10) of the open end of frame 127 in response to the pressure applied from fluid 38 in the chamber 136. In its extended position, membrane 133 assumes a convex upper surface 140 for rolling the sheet 20 onto the rigid mold 119. However, the radius of curvature of the extended membrane 133 is generally smaller than the radius of curvature of extended membrane 33 since in the preferred manner of operation conformable pressing assembly 116 presses the central area of sheet 20 against the vertex region of the concave female mold. The term concave as used in this specification includes curved or radiused, spherical and multi-radiused curved surfaces. Reference is made to membrane 33 for details of other preferred compositions, properties, and thicknesses.

The combination of the conformable membrane 133 and the controlled pressure in the fluid 38 allows the membrane 133 to roll from the central portion of the sheet 20 to the sheet's perimeter, thus generally conforming to the molding surface of the rigid mold 119. In a similar manner to bladder-molding assembly 10, this rolling action significantly reduces the buckling that is associated with conventional glass bending methods and, consequently, increases the size of the quality zone. However, in some applications where the female mold's radius of curvature is smaller than the curvature of the inflated membrane 133, the conformable pressing assembly 116 presses on or near the perimeter of the heated sheet, rolling from the outside edge portion of the heated sheet to the center of the sheet 20. The rolling action provides a uniformity of pressure that reduces buckling in the heated sheet. Other mold shapes may provide multi-directional rolling action as the conformable membrane presses the heated sheet on the rigid mold surface.

The female mold 119 is particularly useful when bending coated sheets of glass or other conformable material, where the coating is on the concave side of the heated sheet. Coatings can be damaged or distorted when compressed against a rigid mold; therefore, it is preferred to roll the uncoated side of the heated sheet against the rigid mold so that the coated side faces the conformable membrane 133 where the coating will not be damaged or marred by contact with the rigid mold.

The remainder of embodiment 110 of the bladder-molding apparatus is substantially similar to that of embodiment 10 including holder 114 and the remainder of conformable pressing assembly 116.

As best illustrated in FIGS. 4–7, the carrier assembly 14 or 114 for holding the heated sheet before, during, and after bending comprises a hoop frame 50, supported by a carrier arm 52, and a flexible fabric 54 that is supported by hoop frame 50 to provide a conformable support surface for the heated sheet of glass during bending. The hoop frame 50 is preferably formed from angle steel 56. Angle steel 56 includes two substantially orthogonal legs 58 and 60, with vertical leg 58 defining the side 61 of the hoop and leg 60 defining an outwardly extending shoulder 62 around the perimeter of hoop frame 50. Flexible fabric 54 is secured to hoop frame 50 by an adjustable retaining ring/band 64 which compresses the cloth 54 against the side 61 of hoop frame 50 and may rest on shoulder 62. Retaining ring/band 64 is a metal strip and includes plurality of holes or slots on one end and a connector on the other end for increasing or decreasing the diameter of the ring/band 64 to adjust the tension in the ring 64 and the compression on flexible fabric 54.

Preferably, flexible fabric 54 comprises a flexible, stainless steel cloth. More, preferably flexible fabric 54 is a flexible stainless steel cloth, available under the trademark BEKITHERM® FA S800-316L, N. V. BEKAERT S. A. Zwevegen, Belgium. In some applications, flexible fabric 54 may comprise other flexible high temperature cloths, such as a ceramic cloth, fiberglass cloth or, felt, such as, for example Burlington Glass Fabrics Co. Rockleigh, N.J., styles 116, 7781, 1979, or 1926, or any other like insulating cloths. High temperature cloths as referenced herein generally include a material which is flexible and can withstand temperatures in excess of 620° C. Since the density and thickeness of the fabric 54 controls the cooling rate of the heated sheet 20, the weave pattern, thickness, and/or density of the fabric may be varied to tailor the final shape of the bent part. Therefore, its selection depends on the thickness of the sheet being bent and the material of the sheet being bent, whether it is glass, thermoplastic, or plastic or the like. In applications requiring more accuracy, fiberglass cloths having a range of thickness may be used as an overlay on one or more of the stainless steel cloth, the rigid mold, and/or the conformable flexible membrane to vary the cooling rate of the sheet and provide a smoother surface on which the sheet may rest. In glass bending applications, conformable membrane 33 preferably includes a layer of high temperature cloth in order to protect the membrane from the high temperatures associated with the bending of glass. The fiberglass cloths may range in thickness from approximately 0.005 to 0.052 inches thick.

Generally, in cylindrical glass bending, the glass will generally bend toward the side that cools slower. This also occurs, but to a lessor extent, with three dimensional glass bending. Thus, by changing the mold coverings and, hence, the rate of cooling, one can affect the shape of the bend product. The shape of the glass can be fine tuned by adjusting the top to bottom cooling rates. The material type and thickness of the mold coverings vary greatly with the type of product one is trying to bend. The type of bend, two dimensional or three dimensional, sheet size, sheet thickness, product shape, and coatings will influence what type of mold coverings are used. Table 1 illustrates several specific examples of combinations of high temperature fabrics used with the bladder-bending apparatus of the present invention.

TABLE 1

| COVERINGS | AVERAGE RADIUS | MAXIMUM RADIUS | MINIMUM RADIUS |
|---|---|---|---|
| Top Mold/#1 Cloth, Bottom Bladder/#2 Cloth | 22.8 in. | 23.4 in. | 21.6 in. |
| Top Mold/#3 Cloth, Bottom Bladder/#3 & #2 Cloth | 24.1 in. | 27.6 in. | 21.8 in. |

Cloth #1 = BFG Style 1926, Burlington Glass Fabrics Co. Rockleigh, New Jersey
Cloth #2 = Siltemp HT52, Ametek Haveg Div. Wilmington DE.

TABLE 1-continued

| COVERINGS | AVERAGE RADIUS | MAXIMUM RADIUS | MINIMUM RADIUS |
|---|---|---|---|

Cloth #3 = Bekitherm FA S800-316, N.V., Bekaert S.A. Zwevegen, Belgium

Note:
The glass used in these examples was heated to about 1,235 °F. and had dimensions of 12.3125" × 9.1875" × 0.120" and was bent on a 22.6" spherical radius male mold. Eighteen readings were taken per part using a standard 1.5" chord length radius gauge. In the second example, the #2 cloth was outermost and contacted the heated glass.

In one preferred embodiment, carrier assembly 14 also includes a weight 68 to flatten the holding surface 70 of flexible fabric 54. Weight 68 preferably comprises a ring of dense material such as steel or other metal, and sits on fabric 54 between the sides 61 of the hoop frame 50 adjacent the periphery of the heated sheet. Preferably, weight 68 is adjacent the inner perimeter of hoop frame 50. Most preferably, weight 68 comprises a stainless steel ring 72. The diameter of the ring 72 may be sized to fit in the hoop frame 50 immediately adjacent sides 61 so that the fabric 54 is pulled nearly flat and supported in a generally planar position and the holding surface area 70 is maximized. By maintaining the heated sheet 20 flat before bending, the heated sheet 20 will not slump or start to bend significantly before it is rolled against the rigid mold 19 and will not develop the buckles that are associated with slump bending.

Figure 11:
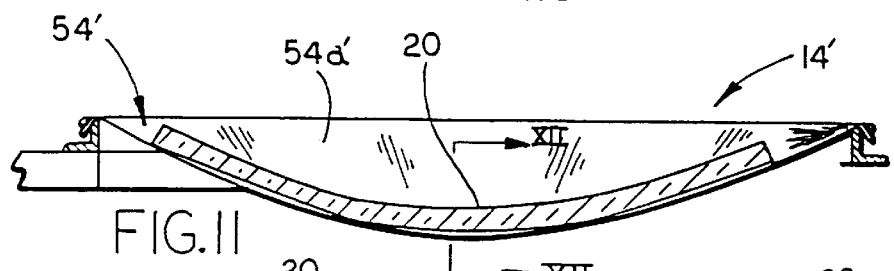
FIG. 11 is a cross-sectional view of a second embodiment of the holder assembly having a concave support surface.
Figures 12, 13:
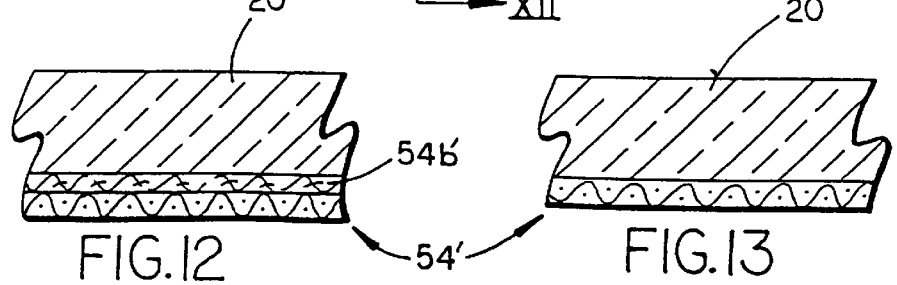
FIG. 12 is a cross-sectional view taken along line XII—XII of FIG. 11.
FIG. 13 is a cross-sectional view similar to FIG. 12 illustrating another embodiment of the support surface.

In another preferred embodiment of carrier assembly 14', shown in FIGS. 11–13, flexible fabric 54' may comprise a formable, stretched stainless steel mesh cloth or perforated metal sheet 54a', which is formed close to the desired final bent shape of the sheet 20. A suitable fabric is 304 SS 26 GA. 5/32" hole diameter, 3/16" staggered pattern from Ferguson Perforating & Wire Co., Providence R.I. In this manner, the support surface for the sheet 20 is non-planar and heated sheet 20 slumps to the shape of the fabric 54'. Preferably, the support surface is generally concave. Furthermore, fabric 54' may include a layer of high temperature cloth 54b', which overlays the metal mesh cloth layer and forms a contact surface on which heated sheet 20 is placed (FIG. 12).

As described above in reference to cooling plate 26, 126 in the first mold assembly 12, 112 and the cooling properties of the high temperature cloths 54, the bending process includes a cooling step. The cooling process assures that once the sheet has achieved its desired shape, it is cooled sufficiently to maintain its shape. Therefore, like the rigid mold assembly 12 and the carrier assembly 14, the conformable pressing assembly 16 also includes a device for cooling. Preferably the cooling device comprises cooling coils 74 or 174 (FIGS. 4 and 10) which are positioned in chamber 36 or 136 to cool fluid 38 and, ultimately, membrane 33 or 133. Coils 74, 174 extend exteriorly of the chamber to connect to a coolant water supply (not shown). Coolant water is flushed through coils 74 or 174, entering coils 74 or 174 from an inlet side of the coils and discharging from an outlet side of the coils. Since coils 74 or 174 are immersed in fluid 38, the heat from fluid 38 is absorbed by the coolant water in the coils, which is then discharged at the outlet side of the cooling coils. This continual flushing of coolant water through coils 74 or 174 draws the heat from fluid 38, which draws heat from membrane 33 or 133, and maintains the temperature of fluid 38 in the chamber 36 or 136 to a range of 70 degrees F. to 120 degrees F. Most, preferably, the temperature of fluid 38 is maintained between 90 degrees F. and 100 degrees F. Consequently, fluid 38 serves two functions—it both inflates and cools membrane 33 or 133.

Cooling coils 74, 174 are housed in a compartment 75 of chamber 36, 136 below a perforated holding plate 76, 176. Holding plate 76, 176 is provided to contain air bag 42 or 142 in the lower portion of chamber 36 and prevent air bag 42, 142 from floating up into the upper portion of chamber 36 and interfering with the functions of fluid 38 of inflating and cooling membrane 33. Plate 76, 176 is supported from the interior of cylindrical wall 28 and by a cylindrical, vertical partition wall 77, 177, which extends below plate 76, 176 to die plate 29, 129. Preferably, plate 76, 176 is positioned below the fully flexed, downward position of membrane 33. As shown, holding plate 76, 176 is circular and conforms to the inner perimeter of cylindrical wall 28 or 128 and is supported by bolts 26a or 126a which extend through flanges 26b or 126b (FIG. 6) provided on the interior surface of cylindrical wall 28 or 128. However, plate 76, 176 may also comprise a multi-sided shape plate, such as a square, hexagon, or octagon plate. Yet, the closer the plate 76, 176 conforms to the inner perimeter of the cylindrical wall, the smaller the gap between the plate 76, 176 and the cylindrical wall 28 or 128 and the less likely that the air bag 42, 142 will interfere with pressurization and cooling of membrane 33, 133. To assure that the fluid in chamber 36 or 136 can flow freely through chamber 36 or 136, partition wall 77, 177 is provided with a plurality of apertures 78, 178. Apertures 78, 178 permit the fluid 38 to flow through chamber 36 or 136 and compartment 75 or 175 so that air bag 42, 142 can pressurize fluid 38. Furthermore, apertures 78, 178 permit fluid 38 to circulate adjacent cooling coils 74, 174. As shown, apertures 78, 178 are semi-circular, but may comprise any geometric shape. It should be understood from the description, that the vertical nature of cooling coils 74, 174 causes the fluid 38 in chamber 36 or 136 to move in a circular pattern around coils 74, 174 giving a convective cooling to fluid 38.

Preferably, fluid 38 cools membrane uniformly so that rigid sheet 20 is similarly uniformly cooled. Therefore, the process control steps preferably include the step of removing air bubbles from fluid 38. Air bubbles typically result from dissolved gases in the fluid being released by the heat from the heated sheet of glass 20. As best seen in FIG. 10 in reference to the second embodiment to the bladder-molding apparatus, air bubbles generally collect at or near the apex of membrane 133 and, therefore, may form undesirable thermal discontinuities in membrane 133 and, consequently, form undesirable stress marks in heated sheet of glass 20. The air bubbles may be removed by a conduit 79a. Conduit 79a is preferably a flexible tube that can move as the pressure of the conformable pressing assembly 116 increases and as membrane 133 is compressed so that it does not interfere with the bending process. Conduit 79a is suspended in fluid 38 by a flotation device 79b, such as a float formed from a low density material, such as cork. Conduit 79a extends exteriorly of chamber 136 to vent the gas in the bubble through a valve 79c. In addition or alternatively, an air absorber solution may be added to fluid 38 to absorb the gas or gases in fluid 38. For example, an additive may comprise air absorber solution WATERWORTH HUSHH-HHH™ available from Waterworth, Lawndale, Calif., which keeps the air in solution. The conduit 79a with float 79b and/or air absorber solution may be used with all embodiments of the bladder-bending method and apparatus, including apparatus 10.

As best seen in FIG. 4, rigid mold 19 includes an aperture 19a, which communicates through a passageway 19b formed in rigid mold 19 and cooling plate 26 with a plant air supply, P. Preferably, the flow of air from plant air supply P is regulated through a valve 80 (FIG. 1) and controlled by control system 21. The flow of air from aperture 19a is used to break a vacuum which typically develops between the mold and the sheet during the bending process. In this manner, the air provides a release mechanism for the heated sheet after bending. Furthermore, in addition to directing air between rigid mold 19 and heated sheet 20, aperture 19a provides a thermal discontinuity in the rigid mold 19. This thermal discontinuity forms a stress mark on the heated sheet. Preferably, aperture 19a is aligned along an axis of bending to provide a stress mark that can function as a reference mark. In addition, or alternatively, at least one insert 19c may be provided in rigid mold 19 to form another thermal discontinuity in the rigid mold 19. Furthermore, insert 19c may be positioned along an axis of bending. Insert 19c preferably is formed from material having a coefficient of thermal conductivity that is different than the coefficient of thermal conductivity of the rigid mold—it can either be greater or less than the coefficient of the thermal conductivity of the rigid mold. Preferably, the coefficient of thermal conductivity is within the range of between about $99^+$ and 75 percent greater or less than the thermal conductivity of the rigid mold. More preferably, the coefficient of thermal conductivity is within the range of between about $99^+$ and 90 percent greater or less than the thermal conductivity of the rigid mold. Most preferably, the coefficient of thermal conductivity is within the range of between about $99^{30}$ and 98 percent greater or less than the thermal conductivity of the rigid mold. For instance, insert 19c may comprise a ceramic material. More preferably, insert 19c is copper, which has a coefficient of thermal conductivity that is greater than that of the preferred aluminum mold. Of course, other materials could also be used such as silver. Most preferably, the thermal discontinuity comprises an air hole. Where more than one thermal discontinuity is provided, inserts 19c and/or apertures 19a may be aligned along more than one axis of bending. In this manner, the stress marks in the sheet 20 may be used to locate the sheets axes of bending, and can be used in cutting the bent sheet 20 to size. As will be apparent, aperture 119a conduit 119b and/or inserts similar to inserts 119c may be used with female mold embodiment 110 in the same manner.

Control system 21 includes a control unit 82 which actuates drive system 22 and the pressure system 23. Drive system 22 includes hydraulic cylinder 30 which extends and withdraws to move conformable pressing assembly 16, 116 from its holding position to its pressing position. As shown in FIG. 6, when cylinder 30 is fully extended, conformable assembly 16, 116 is in the fully conforming position wherein membrane 33, 133 completely covers sheet 20 and generally conforms to the convex, concave, or compound shape of rigid mold 19 or 119. Pressure system 23 includes the plant air supply P, valve 48, valve 80, and tubing 44a, 84a, 84b, and 79. Tubing 84a supplies the plant air to valve 48, which in turn supplies air to the air bag 42, 142 through tubing 44a in chamber 36 or 136 for inflating air bag 42, 142. When the pressure in bag 42, 142 exceeds the desired maximum pressure, for example, 4 psi, the pressure regulator valve 48 operates like a pressure relief valve and releases the pressure in the bag 42, 142. At the same time, valve 48 maintains the fluid pressure within a range of between about 15 and 2 psi. More preferably, valve 48 maintains the fluid pressure at a relatively constant pressure, for example 4 psi. Tubing 84b delivers air from plant air supply P to aperture 19a through valve 80 and tubing 79. When the bending process is complete, control system 21 activates valve 80 to deliver plant air to passageway 19b, 119b through tubing 79.

Figure 8:
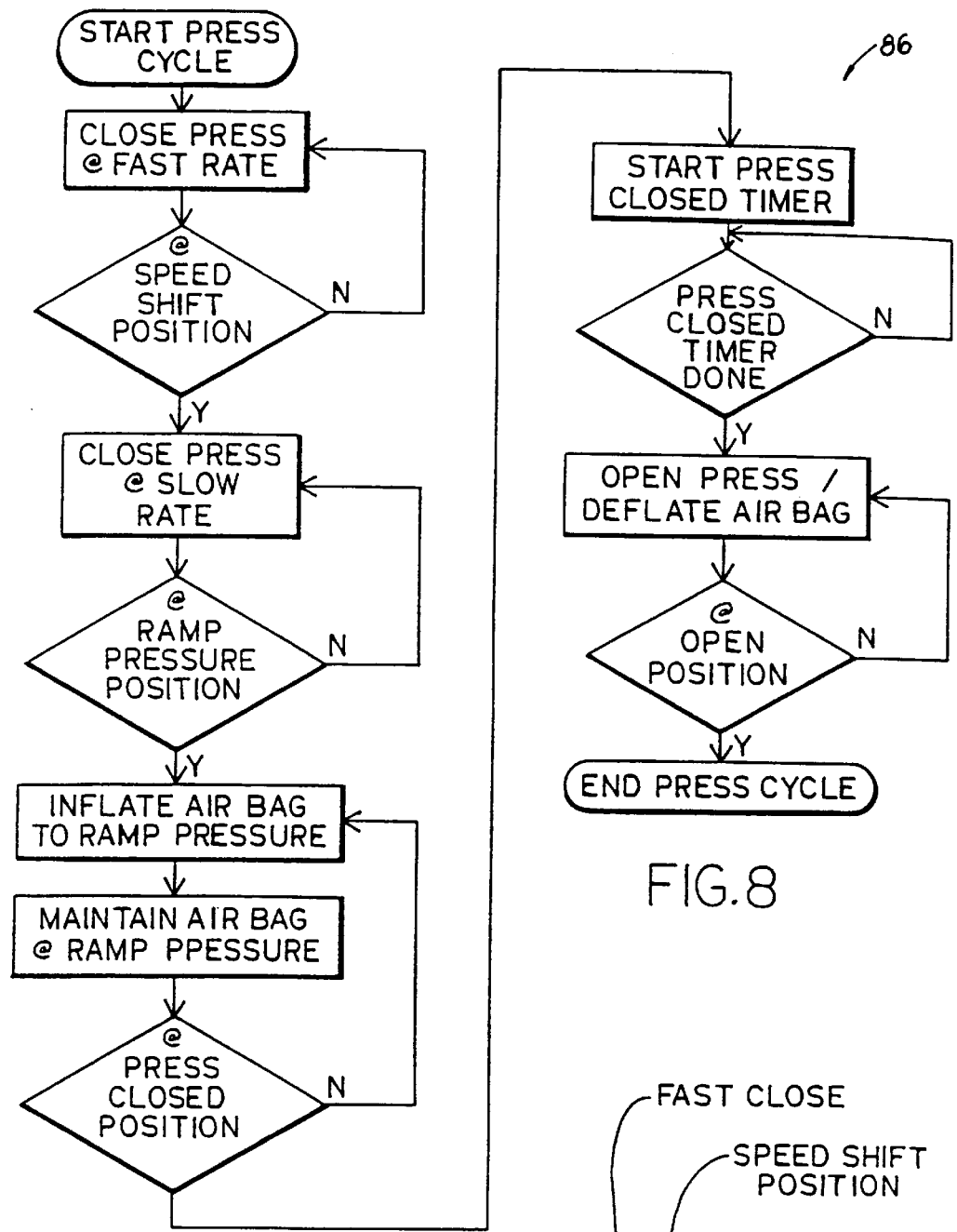
FIG. 8 is a flowchart of the software program used in the control system.
Figure 9:
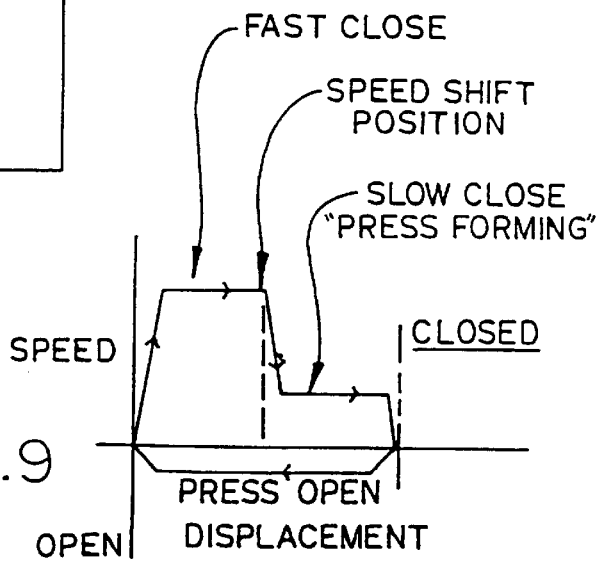
FIG. 9 is a graph of the pressure that is applied to the conformable membrane.

Control unit 82 may comprise a microprocessor or a conventional personal computer. Control unit 82 (FIG. 1) preferably comprises a programmable logic controller (PLC), model PLC-5, available from ALLEN BRADLEY in Milwaukee, Wis., which is programmed with a software program 86. Preferably the programmable logic controller includes a linear positioning module, model 1771-QB, and an analog output module, model 1771-NBVI, both available from ALLEN BRADLEY. The flow chat for the software program 86 is shown in FIG. 8. The software program 86 is a sequencing program which operates on one basic input parameter, the position of the conformable pressing assembly 16. Based on the position of the conformable pressing assembly 16, the software program selects and initiates a sequence that is preprogrammed into the PLC 82. As shown in FIG. 8, in general the first step is to activate valve 30a, which delivers hydraulic fluid to the cylinders 30 to extend the cylinder 30 at a close press fast rate until the conformable pressing assembly 16, 116 reaches a speed shift position. At the speed shift position, control system 21 actuates valve 48 to deliver air to air bag 42, 142 through tubing 44a until the pressure in the fluid 38 and bag 42, 142 reaches desired ramp pressure, for example, 4 psi. At the same time, the speed of the pressing assembly 16, 116 is slowed to a close press slow rate by reducing the flow of hydraulic fluid to the cylinder 30 through valve 30a. As the membrane 33, 133 continues to make contact and moves closer to rigid mold 19, 119, the pressure in air bag 42, 142 increases, at which point pressure regulator valve 48 discharges the air from bag 42, 142 through outlet 44 and tubing 44a to maintain the pressure in bag 42, 142 at, for example, 4 psi. When cylinder 30 reaches its full stroke position, control unit 82 actuates valve 30a to release the hydraulic pressure in cylinder 30 so that it returns to its fully withdrawn position and conformable pressing assembly 16, 116 is returned to its holding position. A graphical representation of one preferred sequence of the pressurizing and the de-pressuring of the fluid 38 is shown in FIG. 9. FIG. 9 illustrates the relationship between the position of the conformable pressing assembly 16, 116 and the speed of conformable pressing assembly 16, 116. The arrows on the graph indicate the direction of the sequence. It should be understood that this is just one form of the sequence which may be used in the bending process.

In operation, it should be understood that once heated sheet 20 is in a position between the rigid mold assembly 12, 112 and conformable pressing assembly 16, 116, control system 21 moves conformable pressing assembly 16, 116 toward rigid mold assembly 12, 112 at a first rate of speed. When the sheet is glass, it is first heated to a temperature between about 1000° F. and 1250° F. before being positioned between the mold assembly and conformable pressing assembly. Other materials are heated to a suitable temperature allowing them to be pressed and formed but not be in a molten state. Such temperature will vary with the material. For example, a sheet of thermoplastic material may become suitably formable at 150° F. Control system 21 monitors the position of assembly 16, 116 with respect to rigid mold assembly 12, 112. When assembly 16, 116 reaches a speed shift position, the control system 21 inflates air bag 42, 142 to pressurize fluid 38 in chamber 36, 136 to the ramp pressure. The ramp pressure is preferably in the range of 2 psi to 7 psi. Most preferably, ramp pressure is in the range of approximately 4 psi to 4.2 psi. As air bag 42, 142 inflates, the pressure in the fluid 38 increases and, since fluid 38 is substantially incompressible, fluid 38 inflates the flexible membrane 33, 133. Inflated, flexible membrane 33, 133 assumes a convex shape, having a convex upper surface 40, 140 for pressing the central portion of heated sheet 20. Control system 21 then extends conformable pressing assembly 16, 116 toward the carrier assembly 14, 114 and the rigid mold assembly 12, 112 at a second rate of speed so that the apex 49, 149 (FIGS. 4 and 10) of the convex surface of membrane 33, 133 presses the central portion of the heated sheet of glass 20 against the rigid mold 19, 119. Alternatively, depending on the radii of membrane 133 and female mold 119, the convex upper surface of membrane 133 may first contact the peripheral edges of the heated sheet as described above. The rolling action of the membrane against the female mold 119 may be multi-directional, depending on the specific mold shape. Similarly, for molds having complex curvatures on their surfaces, the rolling action may be multi-directional as the membrane and mold are moved toward one another. As the membrane 33, 133 is pushed toward rigid mold 19, 119, rigid mold 19, 119 exerts a counter pressure on membrane 33, 133 which causes the membrane 33, 133 to deform and to increase the pressure in the fluid 38. Control system 21 is programmed to maintain the pressure in fluid 38 at a controlled ramp pressure and, therefore, releases pressure in air bag 42, 142 through valve 48 as the pressure from rigid mold 19, 119 on the membrane increases above the desired ramp pressure. Control system 21 moves conformable pressing assembly 16, 116 until membrane 33, 133 completely covers the entire surface area of the sheet 20 and, at which point, membrane 33, 133 fully conforms heated sheet 20 to the shape of rigid mold 19, 119. Once the press is closed, the pressure in fluid 38 is preferably maintained at relatively constant pressure, usually 10 p.s.i. or less, to ensure consistent thermal contact between all the pressing elements during the cooling phase. Consequently, valve 48 is preferably a proportional valve which relieves the pressure in air bag 42, 142 when the pressure in bag 42, 142 reaches a selected maximum pressure. Valve 48 deflates air bag 42, 142 when the pressure in fluid 38 exceeds the maximum pressure and allows air to flow into air bag 42, 142 when the pressure in fluid 38 decreases below a minimum pressure. After the press cycle is complete, control system 21 actuates valve 80 to permit the flow of air from plant air supply P to be delivered to aperture 19a, 119a so that the bent sheet of glass 20 is released from rigid mold 19, 119.

While the description of the first preferred embodiment is described in reference to conformable pressing assembly 16, 116 being extendably supported on frame F and being moved from a holding position to a pressing position by a cylinder 30, it should be understood that more than one cylinder can be provided. Furthermore, rigid mold assembly 12, 112 can be similarly extendably supported on support structure S and can include at least one cylinder to move the rigid mold assembly 12, 112 from a holding position to a pressing position while conformable pressing assembly 16, 116 is stationary. Moreover, the rigid mold assembly 12, 112 and conformable pressing assembly 16, 116 may be supported and positioned to reciprocate along any plane, including a horizontal plane, or a canted plane, such 45 degrees. Therefore, references to "upper" and "lower" are not intended to limit the scope of the invention to rigid assembly 12, 112 and conformable pressing assembly 16, 116 positioned and spaced along a vertical axis.

While several forms of the invention have been shown and described, other forms will now be apparent to those skilled in the art. The embodiments of the invention shown in the drawings are not intended to limit the scope of the invention which is defined by the claims which follow.

We claim the exclusive property or privilege in the embodiments of the invention defined as:

1. A heated sheet bending apparatus for bending a sheet of material, the sheet of material being heated to a formable state and having a central portion and a perimeter, said apparatus comprising:
   a rigid mold, said rigid mold having a molding surface; and
   a conformable pressing element;
   a frame supporting said conformable pressing element, said bending apparatus being constructed and arranged to move one of said conformable pressing element and said rigid mold between a holding position in which said conformable pressing element is spaced from said rigid mold and initial and final pressing positions;
   a control urging said conformable pressing element to assume a generally convex outer surface before said bending apparatus is in said initial pressing position, said convex outer surface defining a pressing surface for pressing a portion of the heated sheet when said one of said conformable pressing element and said rigid mold is moved from said holding position to said initial pressing position, said pressing surface flexing as said bending apparatus moves said one of said conformable pressing element end said rigid mold from said initial pressing position to said final pressing position whereby said conformable pressing element rolls against the heated sheet and rolls the heated sheet against said rigid mold for conforming the heated sheet to said molding surface of said rigid mold.

2. The heated sheet bending apparatus according to claim 1, wherein said conformable pressing element comprises a flexible diaphragm.

3. The heated sheet bending apparatus according to claim 2, wherein said frame includes a chamber below said diaphragm and a substantially incompressible, pressurized fluid in said chamber for expanding and urging said flexible diaphragm to assume said generally convex outer surface.

4. The heated sheet bending apparatus according to claim 3, wherein said substantially incompressible, pressurized fluid comprises water.

5. The heated sheet bending apparatus according to claim 2, said frame having an open end, said frame supporting said flexible diaphragm to extend over said open end, and said flexible diaphragm constructed and arranged to flex in and out of said open end of said frame for pressing and rolling the heated sheet against said rigid mold.

6. The heated sheet bending apparatus according to claim 1, further comprising a carrier for holding the heated sheet before, during, and after bending, said carrier including a holding surface.

7. The heated sheet bending apparatus according to claim 6, wherein said holding surface is generally flexible and constructed and arranged to maintain the heated sheet substantially flat before bending.

8. The heated sheet bending apparatus according to claim 6, wherein said holding surface is formable and is generally concave.

9. The heated sheet bending apparatus according to claim 6, wherein said rigid mold is supported on a press frame, said press frame including a cooling apparatus to cool said rigid mold.

10. The heated sheet bending apparatus according to claim 9, wherein said cooling apparatus includes a cooling plate adapted to cool said rigid mold.

11. The heated sheet bending apparatus according to claim 1, wherein said rigid mold includes at least one thermal discontinuity.

12. The heated sheet bending apparatus according to claim 11, wherein said at least one thermal discontinuity comprises an aperture.

13. The heated sheet bending apparatus according to claim 11, wherein said rigid mold comprises a material selected from the group consisting of aluminum and aluminum alloy.

14. The heated sheet bending apparatus according to claim 1, wherein said rigid mold comprises a rigid male mold having a generally convex molding surface.

15. The heated sheet bending apparatus to claim 14, wherein said rigid male mold is covered with a high temperature cloth.

16. The heated sheet bending apparatus according to claim 1, wherein said rigid mold comprises a rigid female mold having a generally concave molding surface.

17. The heated sheet bending apparatus according to claim 16, wherein said rigid female mold is covered with a high temperature cloth.

18. The apparatus of claim 1 in combination with a sheet of heated glass, said conformable pressing element pressing and rolling said heated glass sheet against rigid mold.

19. The heated sheet bending apparatus of claim 18 wherein said glass sheet has a temperature between about 1000° F. and 1250° F. prior to said comformable pressing element pressing and rolling said heated sheet of glass against said rigid mold.

20. An apparatus for bending a sheet of material heated to a formable state, the sheet having a central portion and a perimeter, said apparatus comprising:
   a rigid mold, said rigid mold having a molding surface;
   a conformable pressing element configured and arranged to reciprocate between a holding position spaced from said rigid mold and a pressing position for pressing and rolling the heated sheet against said rigid mold, said conformable pressing element comprising a flexible diaphragm and being further configured and arranged to assume a generally convex upper surface for pressing the heated sheet and configured and arranged for rolling the heated sheet against said rigid mold for conforming the heated sheet to said molding surface of said rigid mold; and
   a frame supporting said flexible diaphragm, said frame including a chamber below said diaphragm and a substantially incompressible, pressurized fluid in said chamber for expanding and urging said flexible diaphragm to assume said generally convex upper surface, and said chamber including a body of compressible fluid to pressurize said incompressible fluid.

21. The apparatus according to claim 20, further comprising:
   a conduit; and
   a bag containing said body of compressible fluid, said bag connected to said conduit for communication with a supply of compressible fluid for inflating or deflating said bag to increase or decrease pressure in said substantially incompressible fluid.

22. The apparatus according to claim 21, wherein said conduit includes a pressure regulator to control a flow of the compressible fluid to and form the bag to regulate pressure in the bag and the pressure in the incompressible fluid.

23. An apparatus according to claim 22, wherein said pressure regulator is controlled by a control unit.

24. An apparatus according to claim 23, wherein said control unit includes a programmable logic controller.

25. The apparatus according to claim 21, wherein said compressible fluid comprises air.

26. An apparatus according to claim 22, wherein said compressible fluid comprises gaseous air.

27. An apparatus according to claim 23, wherein said control unit includes a computer.

28. The apparatus according to claim 20, wherein said substantially incompressible, pressurized fluid comprises water.

29. An apparatus for bending a sheet of material heated to a formable state, the sheet having a central portion and a perimeter, said apparatus comprising:

a rigid mold, said rigid mold having a molding surface; and a flexible diaphragm constructed and arranged to reciprocate between a holding position spaced from said rigid mold and a pressing position for pressing and rolling the sheet against said rigid mold, said flexible diaphragm further constructed and arranged to assume a generally convexed upper surface for pressing the sheet and for rolling the sheet against the rigid mold for conforming the sheet to said molding surface of said rigid mold; and a frame having an open end, said frame supporting said flexible diaphragm to extend over said open end, and said flexible diaphragm constructed and arranged to flex in and out of said open end of said frame for pressing and rolling the heated sheet against said rigid mold and covering said open end of said frame, said flexible diaphragm and said frame defining a closed chamber, said closed chamber filled with a substantially incompressible fluid and including an inflatable bag, and said inflatable bag being configured to hold a quantity of compressible gas such that said inflatable bag can be inflated and deflated to increase or decrease the pressure in said incompressible fluid.

30. An apparatus according to claim 29, further including a pressure regulator, said inflatable bag being inflated and deflated through said pressure regulator.

31. An apparatus according to claim 29, wherein said chamber includes cooling coils for cooling said fluid and said flexible diaphragm.

32. An apparatus for bending a sheet of material heated to a formable state, the sheet having a central portion and a perimeter, said apparatus comprising:

a rigid mold, said rigid mold having a molding surface and a first coefficient of thermal conductivity and including at least one thermal discontinuity, said thermal discontinuity having a second coefficient of thermal conductivity, said first coefficient of thermal conductivity being within a range of between about $99^+$ and 75 percent less than said second coefficient of thermal conductivity; and a conformable pressing element configured and arranged to reciprocate between a holding position spaced from said rigid mold and a pressing position for pressing and rolling the heated sheet against said rigid mold, said conformable pressing element further being configured and arranged to assume a generally convex upper surface for pressing the heated sheet and configured and arranged for rolling the heated sheet against said rigid mold for conforming the heated sheet to said molding surface of said rigid mold.

33. An apparatus for bending a sheet of material heated to a formable state, the sheet having a central portion and a perimeter, said apparatus comprising:

a rigid mold, said rigid mold having a molding surface and a first coefficient of thermal conductivity and including at least one thermal discontinuity, said thermal discontinuity having a second coefficient of thermal conductivity, said first coefficient of thermal conductivity being within a range of between about $99^+$ and 75 percent greater than said second coefficient of thermal conductivity; and a conformable pressing element configured and arranged to reciprocate between a holding position spaced from said rigid mold and a pressing position for pressing and rolling the heated sheet against said rigid mold, said conformable pressing element further being configured and arranged to assume a generally convex upper surface for pressing the heated sheet and configured and arranged for rolling the heated sheet against said rigid mold for conforming the heated sheet to said molding surface of said rigid mold.

34. An apparatus for bending a sheet of material heated to a formable state, the sheet having a central portion and a perimeter, said apparatus comprising:

a rigid mold, said rigid mold having a molding surface and a coefficient of thermal conductivity and including at least one thermal discontinuity, said rigid mold comprising a material selected from the group consisting of aluminum and aluminum alloy, said thermal discontinuity comprising an insert in said rigid mold, said insert having a coefficient of thermal conductivity within a range of between about 75 and $99^+$ percent less than said coefficient of thermal conductivity of said rigid mold thereby forming said thermal discontinuity in said rigid mold; and a conformable pressing element constructed and arranged to reciprocate between a holding position spaced from said rigid mold and a pressing position pressing and rolling the heated sheet against said rigid mold said conformable pressing element further constructed and arranged to assume a generally convex upper surface for pressing the heated sheet and constructed and arranged for rolling the heated sheet against said rigid mold for conforming the heated sheet to said molding surface of said rigid mold.

35. A bending apparatus for bending a sheet of material heated to a formable state, said bending apparatus comprising:

a rigid mold;

a flexible diaphragm constructed and arranged for pressing the heated sheet against said rigid mold, said flexible diaphragm constructed and arranged to extend to form a convex shape said bending apparatus constructed and arranged for relative movement of said rigid mold and said flexible diaphragm between a holding position in which said flexible diaphragm is spaced from said rigid mold and to an initial pressing position and to a final pressing position, said flexible diaphragm initially pressing on a central portion of the heated sheet when said bending apparatus is at said initial pressing position, said flexible diaphragm further constructed and arranged for rolling the heated sheet from its central portion to its peripheral edges for conforming the heated sheet to the rigid mold when said bending apparatus is at said final pressing position; and a holder for supporting the heated sheet between said rigid mold and said flexible diaphragm, said holder having a support surface, said flexible diaphragm constructed and arranged for pushing said heated sheet through said support surface onto said rigid mold for rolling the heated sheet onto the rigid mold.

36. A bending apparatus according to claim 35, wherein said support surface is a generally flat flexible support for supporting the heated sheet generally planar before bending.

37. A bending apparatus according to claim 35, further comprising a frame supporting said flexible diaphragm, said frame including a pressurized system to extend said flexible diaphragm for pressing the heated sheet.

38. A bending apparatus according to claim 37, said frame including a cooling system to cool said flexible diaphragm.

39. A bending apparatus according to claim 37, said frame including a chamber below said flexible diaphragm, said chamber holding a substantially incompressible, pressurized fluid for extending said flexible diaphragm.

40. A bending apparatus according to claim 35, said rigid mold including an aperture for selectively directing air between said rigid mold and the heated sheet for breaking a vacuum between said rigid mold and the heated sheet after the bending process is complete.

41. A bending apparatus according to claim 35, said rigid mold including a plurality of apertures, said apertures for selectively directing air between said rigid mold and the heated sheet for breaking a vacuum between the rigid mold and the heated sheet after the bending process is complete, said apertures aligned along at least one axis of bending of said rigid mold,
whereby said apertures from thermal discontinuities in said rigid mold and provide stress marks in the heated sheet which are useful for later alignment of the bent sheet.

42. The apparatus of claim 35 in combination with a sheet of heated glass, said flexible diaphragm pressing and rolling said heated glass sheet against said rigid mold.

43. The apparatus of claim 42 wherein said glass sheet has a temperature between about 1000° F. and 1250° F. prior to said flexible diaphragm pressing and rolling said heated glass sheet against said rigid mold.

44. A bending apparatus for bending a sheet of material heated to a formable state, said bending apparatus comprising:
   a rigid mold;
   a flexible diaphragm constructed and arranged for pressing the heated sheet against said rigid mold, said flexible diaphragm constructed and arranged to extend to form a convex shape for initially pressing on central portion of the heated sheet, said flexible diaphragm further constructed and arranged for rolling the heated sheet its central portion to its peripheral edges for conforming the heated sheet to the rigid mold; and
   a holder for supporting the heated sheet between said rigid mold and said flexible diaphragm, said holder comprising a hoop frame and a flexible fabric supported by said hoop frame, said hoop frame having a support surface an inner perimeter and an outer perimeter, said outer perimeter defining opposed sides, and said flexible fabric extending between said opposed sides of said hoop frame and providing said support surface inwardly of said inner perimeter for the heated sheet, said flexible diaphragm constructed and arranged for pushing said heated sheet through said support surface onto said rigid mold for rolling the heated sheet onto the rigid mold.

45. A bending apparatus according to claim 44, wherein said flexible fabric comprises a metal cloth.

46. A bending apparatus according to claim 45, wherein said flexible fabric includes a layer of high temperature cloth overlaying said metal cloth.

47. A bending apparatus according to claim 45, wherein said flexible fabric comprises stainless steel.

48. A bending apparatus according to claim 44, wherein said flexible fabric comprises a ceramic cloth.

49. A bending apparatus for bending a sheet of material heated to a formable state, said bending apparatus comprising:
   a rigid mold;
   a flexible diaphragm configured and arranged for pressing the sheet against said rigid mold, said flexible diaphragm configured and arranged to extend to form a convex shape for initially pressing on a central portion of the heated sheet, said flexible diaphragm further configured and arranged for rolling the heated sheet from its central portion to its peripheral edges for conforming the heated sheet to the rigid mold; and
   a holder for supporting the heated sheet between said rigid mold and said flexible diaphragm, said holder comprising a hoop frame and a flexible fabric supported by said hoop frame, said flexible fabric providing a support surface for the heated sheet, said hoop frame including an inner perimeter, and said flexible fabric supporting a weight adjacent said inner perimeter of said hoop frame whereby said flexible fabric is tensioned by said weight to form a generally planar, flexible support surface, and said flexible diaphragm being configured and arranged for pushing said heated sheet through said flexible support surface.

50. A bending apparatus according to claim 49, wherein said flexible fabric comprises a high temperature cloth.

51. A bending apparatus for bending a sheet of material heated to a formable state, said bending apparatus comprising:
   a rigid mold;
   a flexible diaphragm configured and arranged for pressing the heated sheet against said rigid mold, said flexible diaphragm configured and arranged to extend to form a convex shape for initially pressing on a central portion of the heated sheet, said flexible diaphragm further configured and arranged for rolling the heated sheet from its central portion to its peripheral edges for conforming the heated sheet to the rigid mold;
   a frame supporting said flexible diaphragm, said frame including a pressurized system to extend said flexible diaphragm for pressing the heated sheet, said frame including a chamber below said flexible diaphragm, said chamber holding a substantially incompressible pressurized fluid for extending said flexible diaphragm, and said chamber including an inflatable bag to pressurize said incompressible fluid; and
   a holder for supporting the heated sheet between said rigid mold and said flexible diaphragm, said holder having a support surface, and said flexible diaphragm being configured and arranged for pushing the heated sheet through said support surface for rolling the heated sheet onto the rigid mold.

52. A bending apparatus according to claim 51, wherein said inflatable bag is connected to a conduit, said conduit having a pressure regulator for controlling inflation and deflation of said inflatable bag.

53. A bending apparatus according to claim 52, wherein said pressure regulator is controlled by a control unit.

54. A bending apparatus according to claim 53, wherein said control unit comprises a computer.

55. A bending apparatus according to claim 53, wherein said control unit includes a programmable logic controller.

56. A bending apparatus for bending a sheet of material heated to a formable state the sheet having a central portion and a perimeter, said bending apparatus comprising:

a press frame;

a rigid mold supported by said press frame, said rigid mold having at least one molding surface;

a bladder frame having an open end, at least one of said rigid mold and said bladder frame being constructed and arranged to move from a holding position to a pressing position;

a holder interposed between said bladder frame and said rigid mold, said holder for supporting the sheet of formable material;

a flexible membrane supported by said bladder frame over said open end and below said press frame, said flexible membrane defining a chamber with said bladder frame, said chamber including an inlet and outlet through which the chamber is pressurized during a press cycle such that when said chamber is pressurized, said flexible membrane is extended from said bladder frame when said one of said bladder frame and said rigid mold is in said holding position and forms a convex top surface for pressing the heated sheet and for rolling the heated sheet against said molding surface of said rigid mold; and a control system constructed and arranged to increase or decrease the pressure in said chamber and to move one of said rigid mold and said bladder frame toward the other during the press cycle for pressing the sheet of formable material through said holder and against said rigid mold thereby rolling the heated sheet onto said rigid mold.

57. The apparatus of claim 56 in combination with a sheet of heated glass, said flexible membrane pressing and rolling said heated glass sheet against said rigid mold.

58. The apparatus of claim 57 wherein said glass sheet has a temperature between about 1000° F. and 1250° F. prior to pressing and rolling said heated glass sheet against said rigid mold.

59. A bending apparatus for bending a sheet of material heated to a formable state, said bending apparatus comprising:

a press frame;

a rigid mold supported by said press frame, said rigid mold having at least one molding surface;

a bladder frame having an open end;

a flexible membrane supported by said bladder frame over said open end and below said bladder frame, said flexible membrane defining a chamber with said press frame, said chamber including an inlet and an outlet through which the chamber is pressurized during a press cycle such that when said chamber is pressurized, said flexible membrane is extended from said bladder frame and forms a convex top surface for pressing the heated sheet and for rolling the heated sheet against said molding surface of said rigid mold, and said chamber being filled with a substantially incompressible fluid in pressure contact with said flexible membrane and an inflatable bladder for increasing the pressure of said incompressible fluid against said flexible membrane; and a control system configured and arranged to increase or decrease the pressure in said chamber and to move one of said rigid mold and said bladder frame toward the other during the press cycle for rolling the heated sheet onto said rigid mold.

60. A bending apparatus according to claim 59, wherein said control system includes a programmable logic controller.

61. A bending apparatus according to claim 59, wherein said control system includes a computer.

62. A bending apparatus according to claim 59, wherein said control system includes a cylinder for moving one of said press frame and said bladder frame toward the other.

63. A bending apparatus according to claim 62, wherein said cylinder is a hydraulic cylinder.

64. A bending apparatus according to claim 62, wherein said cylinder is a pneumatic cylinder.

65. A bending apparatus according to claim 59, said rigid mold including at least one aperture for directing air between said rigid mold and the heated sheet for breaking a vacuum between the rigid mold and the heated sheet after the bending process is complete, said aperture providing a thermal discontinuity in said rigid mold for marking said heated sheet with a stress mark.

66. A bending apparatus according to claim 59, said rigid mold including a plurality of apertures, said apertures for selectively directing air between said rigid mold and the heated sheet for breaking a vacuum between said rigid mold and the heated sheet after the bending process is complete, said apertures aligned along at least one axis of bending of said rigid mold, whereby said apertures form thermal discontinuities in said rigid mold and provide stress marks in the heated sheet.

67. A bending apparatus according to claim 59, further including a holder constructed and arranged to hold the heated sheet before, during, and after the press cycle.

68. A bending apparatus according to claim 67, said holder including a flexible, high temperature cloth, said high temperature cloth providing a flexible support surface for the heated sheet.

69. A bending apparatus according to claim 67, said flexible membrane including a high temperature cloth cover.

70. A bending apparatus according to claim 67, said rigid mold having a high temperature cloth cover extending over said molding surface.

71. A bending apparatus according to claim 59, further including a conduit extending exteriorly from said chamber for venting air from said chamber.

72. A bending apparatus according to claim 71, said conduit including a valve to control the flow of air through said conduit.

73. A bending apparatus according to claim 71, said conduit suspended in said incompressible fluid in said chamber by a float.

74. A method of bending a sheet of material heated to a formable state, said method of bending comparing the steps of:

providing a sheet of material heated to a formable state;

pressurizing flexible membrane to extend to form a convex outer surface;

moving one of the pressurized membrane and a rigid mold relative to another of the pressurized flexible membrane and the rigid mold from a holding position with the flexible membrane spaced from the rigid mold to an initial pressing position and a final pressing position; and pressing one of a central portion and a peripheral portion of the heated sheet with the convex outer surface of the flexible membrane against the rigid mold having one of a convex molding surface and a concave molding surface at the initial pressing position and rolling the heated sheet onto the rigid mold when the one of the pressurized flexible membrane and the rigid mold is move to the final pressing position.

75. A method of bending according to claim 74, further comprising maintaining the pressure on the flexible membrane generally constant while pressing the heated sheet.

76. A method of bending according to claim 74, wherein said pressing includes pressing the convex outer surface of the pressurized flexible membrane on the central portion of the heated sheet.

77. A method of bending according to claim 74, further comprising holding the heated sheet generally planar between the flexible membrane and the rigid mold before pressing the heated sheet.

78. A method of bending according to claim 74, further comprising:
   supporting the heated sheet in a holder between the flexible membrane and the rigid mold, and wherein said pressing includes pressing the portion of the heated sheet with the convex outer surface of the flexible membrane through the holder against the rigid mold.

79. A method of bending a sheet of material heated to a formable state, said method of bending comprising the steps of:
   providing a sheet of material heated to a formable state;
   pressurizing a flexible membrane to extend to form a convex outer surface; and
   pressing a portion of the heated sheet with the convex outer surface of the flexible membrane against a rigid mold having one of a convex molding surface and a concave molding surface thereby rolling the heated sheet onto the rigid mold, said pressing a portion of the heated sheet includes pressing a perimeter portion of the heated sheet and rolling the flexible membrane onto the heated sheet from the perimeter portion to a central portion of the heated sheet thereby rolling the heated sheet against the rigid mold.

80. A method of bending a sheet of material heated to a formable state, said method comprising the steps of:
   providing a sheet of material heated to a formable state;
   rolling the heated sheet onto a rigid mold;
   said rolling including pressurizing a flexible membrane and pressing the pressurized flexible membrane against the heated sheet and against the rigid mold during a press cycle; and
   forming a stress mark in the heated sheet.

81. A method of bending a sheet according to claim 80, wherein said forming a stress mark in the heated sheet comprises providing a thermal discontinuity in the rigid mold.

82. A method of bending according to claim 81, wherein said providing a thermal discontinuity in the rigid mold comprises inserting an insert into the rigid mold, the insert having a coefficient of thermal conductivity within a range of between about 75 and 99$^+$ percent greater than a coefficient of thermal conductivity of the rigid mold.

83. A method of bending according to claim 81, wherein said providing a thermal discontinuity in the rigid mold comprises inserting an insert into the rigid mold, the insert having a coefficient of thermal conductivity within a range of between about 75 and 99$^+$ percent less than a coefficient of thermal conductivity of the rigid mold.

84. A method of bending according to claim 81, wherein said providing a thermal discontinuity in the rigid mold comprises:
   forming a passageway in the rigid mold, said passageway having an opening at a surface of said mold, and
   directing air into the passageway after the press cycle is complete so that air will be directed through said opening between the rigid mold the heated sheet to break a vacuum between the rigid mold and the sheet after bending.

85. A method of bending according to claim 80, further comprising directing air between the rigid mold and the sheet after the press cycle is complete to break a vacuum between the sheet and the rigid mold.

86. A method of bending a sheet of material heated to a formable state, said method of bending comprising the steps of:
   providing a sheet of material heated to a formable state;
   rolling the heated sheet onto a molding surface of a rigid mold to form a bent sheet of material, said rolling including pressurizing a flexible membrane and pressing the pressurized flexible membrane against the heated sheet and against the molding surface of the rigid mold during a press cycle; and
   inserting an insert into the molding surface of the rigid mold to create a thermal discontinuity in the molding surface to form a stress mark in the bent sheet of material, the insert having a coefficient of thermal conductivity within a range of between about 75 and 99$^+$ percent less than a coefficient of thermal conductivity of the rigid mold.

87. A method of bending a sheet of glass comprising the steps of:
   providing a sheet of glass heated to a formable statem, the sheet of glass having a central portion and a periphery;
   positioning the heated glass sheet between a rigid male mold and a conformable pressing member;
   holding the heated glass sheet generally planar between and spaced apart from the rigid male mold and the conformable pressing member before bending;
   pressurizing the conformable pressing member to move the conformable pressing member into a convex shape having an apex;
   moving the conformable pressing member toward the heated glass sheet; and
   pushing the central portion of heated glass sheet against the rigid male mold with the apex of the conformable pressing member such that as the conformable pressing member pushes the heated glass sheet against the rigid male mold, the conformable pressing member generally conforms to the shape of the male mold and rolls from the central portion of the heated glass sheet outwardly to the periphery of the heated glass sheet.

88. A method of bending a sheet of glass according to claim 87, further comprising the step of:
   maintaining the pressure on the conformable pressing member within a specified range so that pressure exerted by the conformable pressing member on the heated sheet of glass is generally uniform.

89. A method of bending a sheet of glass according to claim 87, further comprising the step of:
   maintaining the pressure on the conformable pressing member generally constant so that the pressure exerted by the conformable pressing member on the heated sheet of glass is generally uniform.

90. A method of bending a sheet of glass according to claim 87, wherein said pressurizing the conformable pressing member includes:
   providing a frame with an open end;
   extending the conformable pressing member over the open of the frame, thereby defining a chamber in the frame; and
   pressurizing the chamber with an incompressible fluid.

91. A method of bending a sheet of glass according to claim 90, further comprising removing air from the chamber.

92. A method of bending a sheet of glass according to claim 87, wherein said providing the sheet of heated glass comprises a sheet of heated glass having a temperature between about 1000° F. and 1250° F. prior to said positioning.

93. A holder for holding a sheet of material heated to a formable state in a mold assembly before, during, and after bending the sheet in the mold assembly, said holder comprising:

a hoop frame including an inner perimeter; and a flexible, high temperature cloth supported by said hoop frame, said high temperature cloth forming a flexible support surface for supporting the heated sheet, and said high temperature cloth supporting a weight adjacent said inner perimeter, whereby said high temperature cloth is tensioned by said weight to form a generally planar, flexible support surface.

94. A holder for holding a heated sheet according to claim 93, wherein said high temperature cloth is secured to said hoop frame by a tensioned band, a portion of said high temperature cloth extending over an outer perimeter of said hoop frame, and said tensioned band extending around said hoop frame and over said portion of said high temperature cloth to thereby compresss the high temperature cloth therebetween.

95. A holder for holding a heated sheet according to claim 94, wherein said weight comprises a ring-shaped weight.

\* \* \* \* \*

UNITED STATES PATENT AND TRADEMARK OFFICE
CERTIFICATE OF CORRECTION

PATENT NO.  : 5,857,358
DATED : January 12, 1999
INVENTORS : Martin De Vries, Jr. et al.

It is certified that error appears in the above-identified patent and that said Letters Patent is hereby corrected as shown below:

Column 12, line 27:

Please delete "$99^{30}$" and insert in lieu thereof --$90^{+}$--.

Column 15, Claim 1, line 24:

Please delete "end" and insert in lieu thereof --and--.

Column 16, Claim 15, line 11:

Please insert --according-- after "apparatus".

Column 16, Claim 19, line 25:

Please delete "comformable" and insert in lieu thereof --conformable--.

Column 16, Claim 21, line 54:

Please delete "communication" and insert in lieu thereof --communicating--.

Column 16, Claim 22, line 60:

Please delete "form" and insert in lieu thereof --from--.

Column 18, Claim 35, line 48:

Please insert --,-- after "shape".

UNITED STATES PATENT AND TRADEMARK OFFICE
CERTIFICATE OF CORRECTION

PATENT NO. : 5,857,358
DATED : January 12, 1999
INVENTORS : Martin De Vries, Jr. et al.

It is certified that error appears in the above-identified patent and that said Letters Patent is hereby corrected as shown below:

Column 19, Claim 36, line 2:

Please insert --surface-- between "support" and "for".

Column 19, Claim 41, line 26:

Please delete "from" and insert in lieu thereof --form--.

Column 19, Claim 44, line 43:

Please insert --a-- before "central".

Column 19, Claim 44, line 46:

Please insert --from-- after "sheet".

Column 19, Claim 44, line 51:

Please insert -- , -- after "surface".

Column 22, Claim 74, line 46:

Please delete "comparing" and insert in lieu thereof --comprising--.

Column 22, Claim 74, line 49:

Please insert --a-- after "pressurizing".

Column 22, Claim 74, line 51:

Please insert --flexible-- after "pressurized".

UNITED STATES PATENT AND TRADEMARK OFFICE
CERTIFICATE OF CORRECTION

PATENT NO. : 5,857,358
DATED : January 12, 1999
INVENTORS : Martin De Vries, Jr. et al.

It is certified that error appears in the above-identified patent and that said Letters Patent is hereby corrected as shown below:

Column 22, Claim 74, line 64:

Please delete "move" and insert in lieu thereof --moved--.

Column 23, Claim 84, line 62:

Please delete "," after "mold" and insert in lieu thereof --;--.

Column 23, Claim 84, line 65:

Please insert --and-- after "mold".

Column 24, Claim 90, line 63:

Please insert --end-- after "open".

Column 25, Claim 92, line 3:

UNITED STATES PATENT AND TRADEMARK OFFICE
CERTIFICATE OF CORRECTION

PATENT NO.    : 5,857,358
DATED : January 12, 1999
INVENTORS   : Martin De Vries, Jr. et al.

Page 4 of 4

It is certified that error appears in the above-identified patent and that said Letters Patent is hereby corrected as shown below:

Please insert --providing-- after "comprises".

Column 26, Claim 94, line 10:

Please delete "compresss" and insert in lieu thereof --compress--.

Signed and Sealed this

Third Day of October, 2000

*Attest:*

Q. TODD DICKINSON

*Attesting Officer*       *Director of Patents and Trademarks*